US006721766B1

(12) United States Patent
Gill et al.

(10) Patent No.: US 6,721,766 B1
(45) Date of Patent: Apr. 13, 2004

(54) RESTORING MULTIPLE WORK ITEMS SIMULTANEOUSLY FROM BACKUP AND DATA RESTORE

(75) Inventors: William Alton Gill, Harvard, MA (US); Stephen M. Howard, Braintree, MA (US); Robert Alan Boudrie, Ashland, MA (US); Glenn R. Sachar, Reading, MA (US)

(73) Assignee: EMC Corporation, Hopkinton, MA (US)

( * ) Notice: Subject to any disclaimer, the term of this patent is extended or adjusted under 35 U.S.C. 154(b) by 386 days.

(21) Appl. No.: 09/769,581

(22) Filed: Jan. 25, 2001

(51) Int. Cl.[7] ................................................ G06F 17/30
(52) U.S. Cl. ...................... 707/204; 707/200; 707/202; 707/203; 714/11; 714/13; 711/161; 711/162; 709/203; 709/230; 709/249
(58) Field of Search ..................... 707/1–10, 100–104.1, 707/200–205; 711/110–165; 709/203–208, 220–225, 230–235, 105, 249; 714/14–20, 48–50, 11, 13; 710/38–39

(56) References Cited

U.S. PATENT DOCUMENTS

| 5,170,480 A | * | 12/1992 | Mohan et al. ............... 707/201 |
| 5,390,313 A | | 2/1995 | Yanai et al. |
| 5,487,160 A | * | 1/1996 | Bemis ......................... 711/114 |
| 5,544,347 A | | 8/1996 | Yanai et al. |
| 5,649,196 A | * | 7/1997 | Woodhill et al. ............ 707/204 |
| 5,708,769 A | | 1/1998 | Stallmo |
| 5,787,459 A | | 7/1998 | Stallmo et al. |
| 5,933,653 A | | 8/1999 | Ofek |
| 6,009,481 A | | 12/1999 | Mayer |
| 6,029,231 A | | 2/2000 | Blumenau |
| 6,038,379 A | * | 3/2000 | Fletcher et al. ............. 709/230 |
| 6,047,294 A | | 4/2000 | Deshayes et al. |
| 6,173,376 B1 | * | 1/2001 | Fowler et al. ............... 711/162 |
| 6,279,011 B1 | * | 8/2001 | Muhlestein ................. 707/204 |
| 6,314,502 B1 | * | 11/2001 | Piersol ........................ 711/162 |
| 6,487,561 B1 | * | 11/2002 | Ofek et al. .................. 707/204 |
| 6,490,598 B1 | * | 12/2002 | Taylor ......................... 707/204 |
| 6,505,216 B1 | * | 1/2003 | Schutzman et al. ......... 707/204 |

* cited by examiner

Primary Examiner—Srirama Channavajjala
(74) Attorney, Agent, or Firm—Daly, Crowley & Mofford, LLP.

(57) ABSTRACT

A backup and restore system includes a work item server for restoring multiple work times simultaneously. The work item server assigns each work item to a respective trail queue based upon the commonality of the volumes on which the work items are stored. The work item server allocates drives to the trail queues for restoring multiple work items simultaneously. The trail queue have drives assigned for work items in that trail queues to use during a restore. The trail queue has a concurrency defined to predetermine the number of simultaneous work items can run that are associated with the trail queues. Drives can be allocated to the trail queues for executing work item restores associated with the respective trail queues until a predetermined trail queue concurrency is reached.

20 Claims, 21 Drawing Sheets

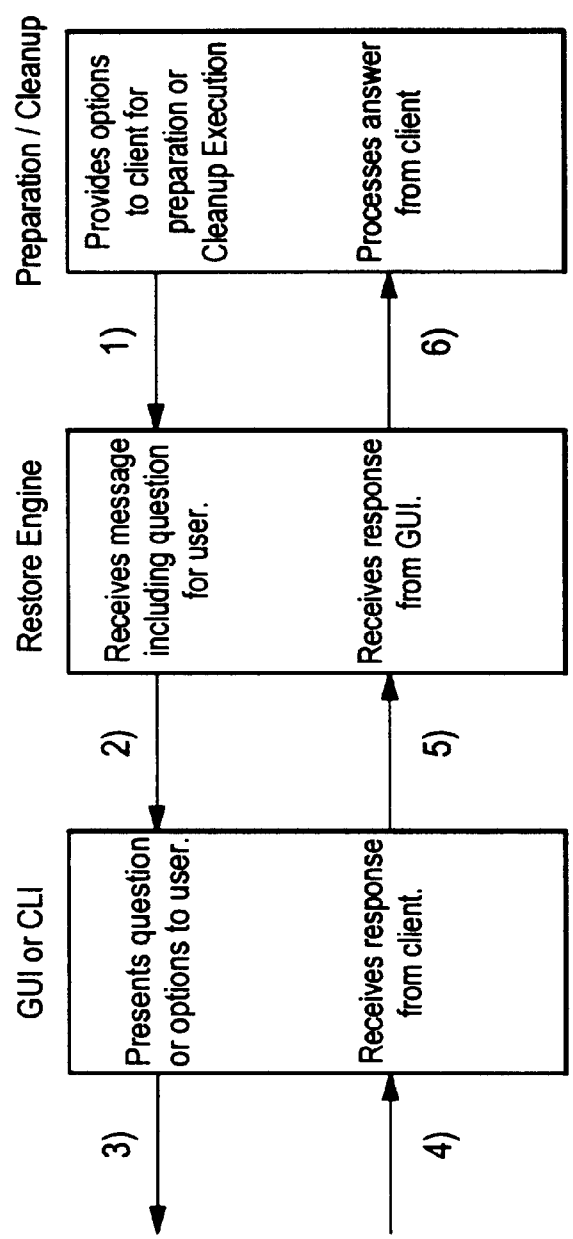
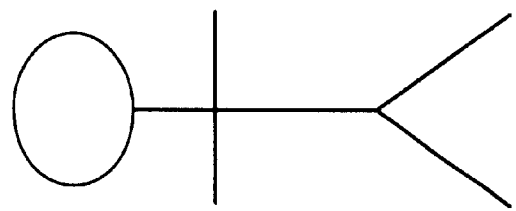
FIG. 8A

RESTORING MULTIPLE WORK ITEMS SIMULTANEOUSLY FROM BACKUP AND DATA RESTORE

FIELD OF THE INVENTION

The present invention relates generally to computer data storage, and more particularly, to systems for backing up and restoring data.

BACKGROUND OF THE INVENTION

There are a variety of systems for backing up computer data that can be subsequently restored. In general, such systems are used to backup data from a plurality of computers or clients connected to one or more networks. A user, such as a system administrator, can restore selected portions of the previously backed up data to a desired client computer. Thus, the loss of data, which can be contained in large databases, is prevented. To increase the backup system reliability, redundant data storage, e.g., data mirroring, can be provided.

FIG. 1 illustrates a conventional data backup system 10 that can be similar to the system shown and described in U.S. Pat. No. 6,047,294 to Deshayes et al, which is incorporated herein by reference. A computer or client 12 communicates with a storage system 14, such as a Symmetrix storage system provided by EMC Corporation of Hopkinton, Mass. The client 12 can be connected to other devices over a network 16 in a manner well known to one of ordinary skill in the art. A backup storage system 18, which can include tape storage devices for example, is also attached to the network 16 for backing up and restoring data. The system can include a direct connection 20, e.g., a small computer system interface (SCSI), between the backup storage system 18 and the storage system 14 associated with the client 12. Such a system can provide logical-logical backups to facilitate the backup of data when the client and backup storage system have different operating systems.

Known backup storage systems have certain disadvantages associated with restoring backed up data. Generally, a backup storage system provides a list of objects, e.g., files, that can be restored by a user. This is usually provided through a hierarchical representation allowing the user to "browse" the backed up files for the purpose of selection. The user then selects or marks the desired objects for restoration. The restoration request is then submitted and executed to restore the requested data to the client. The browse, mark, and submit functions are each implemented via separate software and linked together.

One problem with this approach is that a user must serially browse, mark, submit, and wait until execution of the restore operation is complete since the software modules that perform these functions are linked together. It will be appreciated that the time needed to restore relatively large amounts of data, e.g., one Terabyte, can be quite significant. In addition, the restore operation is tied to the catalogs of backed up data, i.e., file information and attributes. Thus, to support new methods of backing up data or new storage devices, the restore system modules must be modified, re-linked, and distributed to existing backup storage systems.

It would, therefore, be desirable to provide a data backup and restore system that restores data independently from browse, mark and submit operations. It would also be desirable to provide a backup and restore system that can readily restore data backed up using new methods and new storage devices. It would further be desirable to optimize the restoration of multiple objects.

SUMMARY OF THE INVENTION

The present invention provides a data backup and restore system having an architecture that executes data restores independently of browse, mark and submit operations. In general, a restore engine process is created as part of a restore session. The restore engine process retrieves a list of restorable objects for browsing and marking, stores one or more submitted lists of objects marked for restoration, and executes the restore when commanded by the user. This arrangement allows for multiple submissions of objects marked for restoration by a client prior to execution of the restore. In addition, the system can support new backup methods and storage devices with minimal overall impact on the system since the restore operation is not linked to the browse, mark, and submit operations.

In one aspect of the invention, a data backup and restore system includes a server for backing up data from a client storage system under the control of a user associated with a client. The server creates a restore engine process as part of a restore session initiated by the client. The restore engine process communicates with the client via remote procedure calls such that the execution of a restore operation is independent from browsing of restorable objects, marking of restorable objects for restoration, and submitting a list of objects marked for restoration. The submitted list of objects can persist over time to enable the execution of the restore at a scheduled time. A client can make multiple restore submissions prior to initiating the execution of a restore operation. In addition, multiple restore operations can be executed concurrently.

In one embodiment, a user initiates a restore session with a dispatch daemon running on a server on the backup storage system via a graphical user interface associated with a client coupled to the backup storage system. As the restore session is initiated, the dispatch daemon creates a restore engine process that communicates with the client via remote procedure calls. The restore engine process retrieves a list of restorable objects for browsing by the user by interrogating libraries that support catalogs of backed up data. The user can mark the displayed objects for restoration and submit one or more lists of marked objects to the restore engine process via remote procedure calls. After making the desired submissions, the user executes a system command to restore data. To execute the restore data operation, the restore engine generates a work item restore process on the server, a server restore process for generating a data stream of restore data, and a client restore process on the client for receiving the restore data stream. Upon completion of the restore operation, the restore engine process can be terminated.

In a further aspect of the invention, the backup and restore system can support new methods of backing up data and new storage types by adding one or more libraries to the server that are processed during initialization of the restore process. Each restorable object is associated with a given library. The libraries provide catalog data to the restore engine process in a predetermined format. Since a restore session is created by request of the user, libraries, including newly added libraries, are processed as part of the restore session. This technique allows additional libraries for supporting new restorable objects to be readily incorporated into existing systems. The submit object provides to the plug-in the capability of encapsulating the list of files to be restored by incorporating a list of files to be restored that is independent of the catalogs used to provide the browsable list of files to the user.

In another aspect of the invention, a backup and restore system generates a submit object based upon the objects marked for restoration by the user. The user can make multiple restoration requests, each of which corresponds to a submit object. The submit object is formed prior to execution of the restore. The submit object includes one or more submit elements, which have a one-to-one correspondence with a respective submit file. The submit files share the same set of media, e.g., tapes. In general, the submit object encapsulates the information necessary to restore the requested objects so as to provide functional separation between restore execution and the prior browsing, marking, and submitting of files for restoration.

In a still further aspect of the invention, a backup and restore system optimizes the execution of multiple restore requests. The system includes a work item server, which can form a portion of the restore engine, that assigns the works items contained in the submit objects to a respective one of a plurality of trail queues. In general, the work item server optimizes the running of work item by controlling the numbers of drives used by the restore engine and by setting the reader concurrency for a set of media. In one particular embodiment, work items having a predetermined level of volume commonality are assigned to the same trail queue. The work item server allocates a plurality of drives to the trail queues such that multiple work items can be restored simultaneously. In the case where each drive is allocated, upon restoration of each work item in a trail queue the drive is de-allocated from the trail queue and re-allocated to a further trail queue.

BRIEF DESCRIPTION OF THE DRAWINGS

The invention will be more fully understood from the following detailed description taken in conjunction with the accompanying drawings, in which:

FIG. 8A is a pictorial representation of restore engine handling user queries in accordance with the present invention;

DETAILED DESCRIPTION OF THE INVENTION

Figure 1:
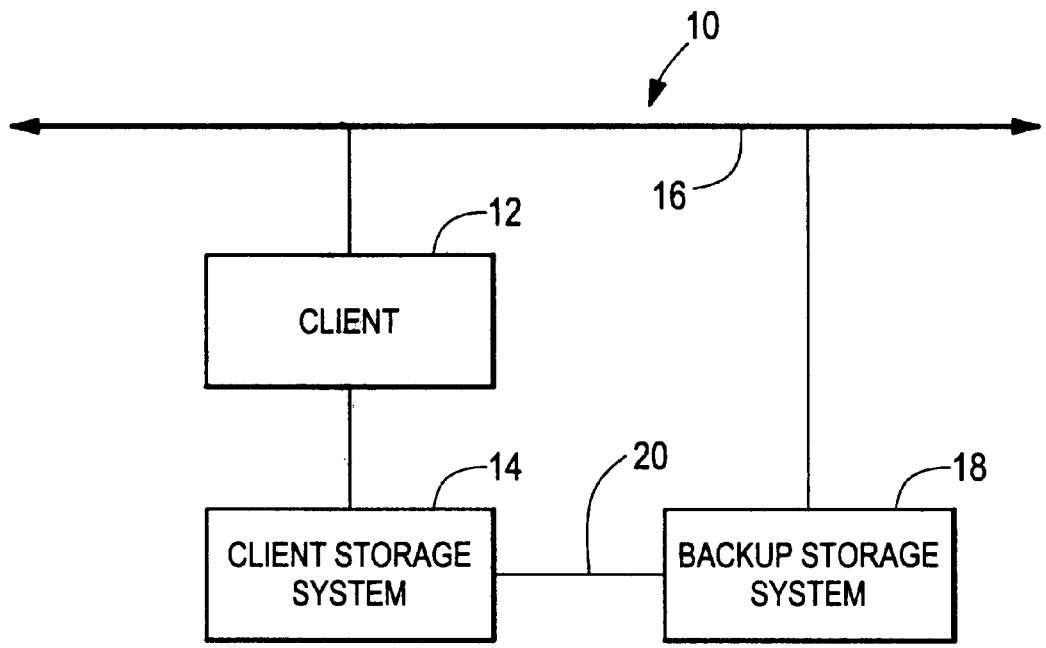
FIG. 1 is a block diagram of a prior art data backup system.
Figure 2:
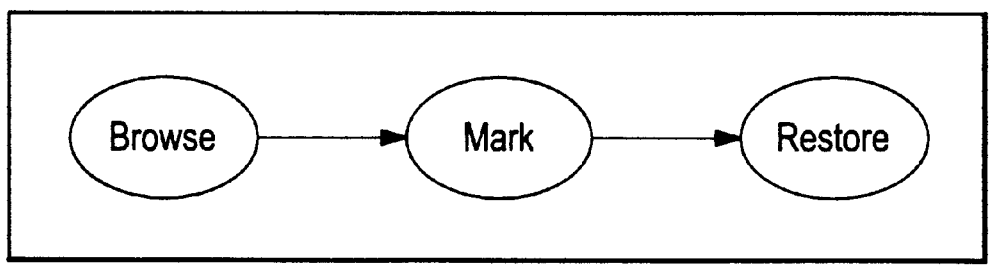
FIG. 2 is a graphical depiction of the relationship of browse, mark, and restore operations in the prior art data backup system of FIG. 1.
Figure 3:
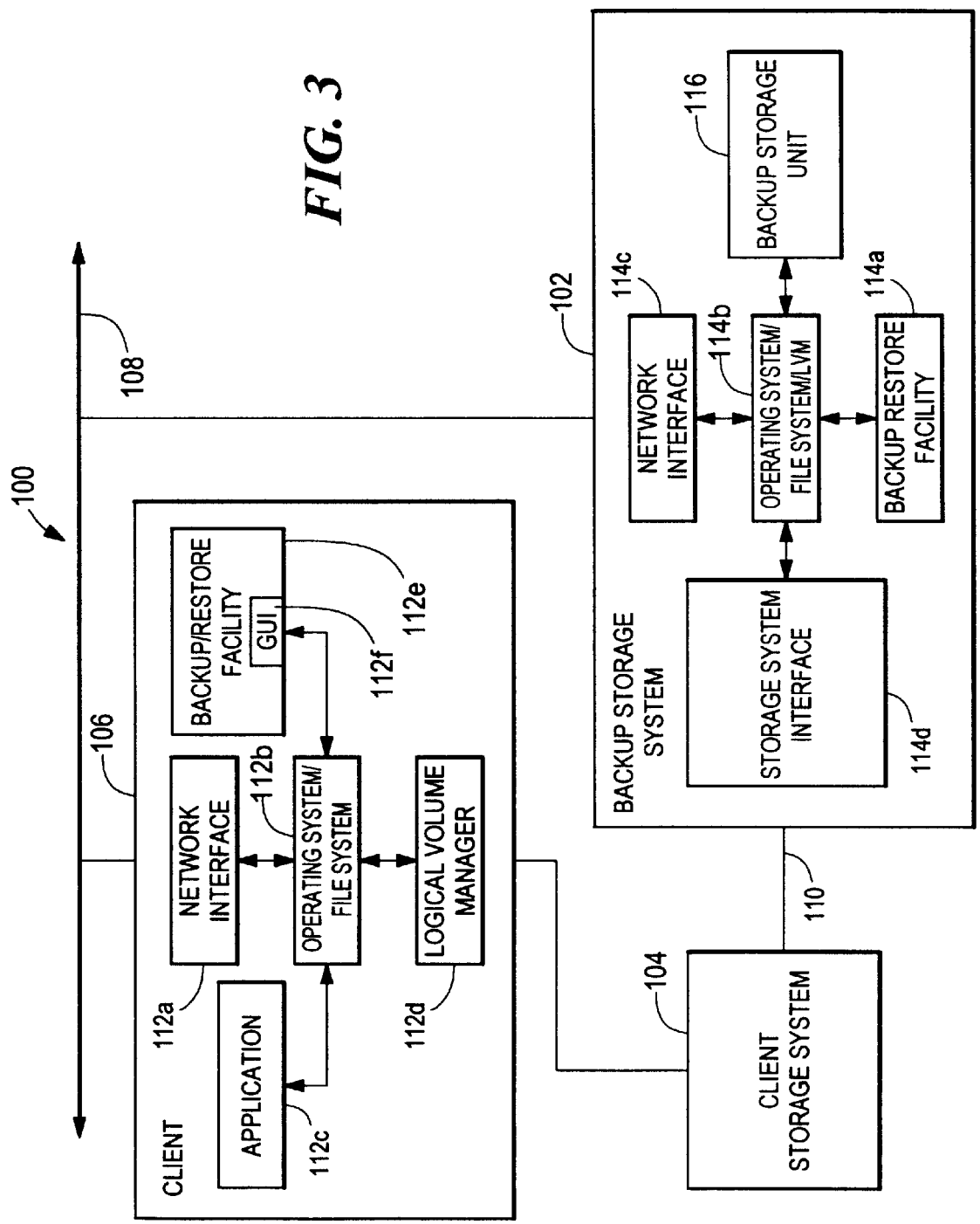
FIG. 3 is a schematic block diagram of a backup storage system having an independent restore operation in accordance with the present invention.

FIG. 3 illustrates a data management system 100 including a backup storage system 102 for backing up data from a client storage system 104 under the control of a client 106. In general, the system 100 executes a restore operation independently from browsing, marking, and submitting operations. This technique allows the submission of multiple restore requests prior to restore execution. In addition, the system has a flexible architecture including plug-in libraries that can facilitate the restoration of data backed up using new data storage techniques, e.g., catalogs, and new data storage devices with minimal impact to the system.

The backup storage system 102, which can also be referred to as the data management (DM) server, is connected to the client 106 via a network 108. The backup storage system 102 can further include an optional direct connection 110, such as a small computer system interface (SCSI), to the storage system 104. The storage system 104 can be provided as a Symmetrix type system provided by EMC Corporation of Hopkinton, Mass.

The client 106 includes a series of software modules 112a–e that implement backup and restore functionality. For example, the client 106 can include a network interface module 112a for allowing an operating system 112b, which can include a file system, to communicate over the network 108. In an exemplary embodiment, the operating system is a Unix operating system such as the Solaris operating system by Sun Microsystems of Palo Alto, Calif. An application module 112c, such as an Oracle database application by Oracle Corporation of Redwood Shores, Calif., interfaces with the operating system 112b. The client can further include a logical volume manager (LVM) module 112d for interfacing with the storage system 104. As described in the '294 Deshayes patent, the LVM module 112d can facilitate logical-logical backup and restore operations. A backup/restore module or facility 112e controls the backup/restore process, which is described in detail below. The backup and restore module 112e includes a graphical user interface (GUI) 112f, which can run on the server or the client, to allow a user to control backup and restore operations.

The backup storage system or server 102 also includes modules 114a–e for providing backup and restore functions. A backup/restore module or facility 114a controls the backup and restoration of data to and from a backup storage unit 116, e.g., a tape unit. The backup/restore module 114a can run under an operating system/file system/LVM module 114b. In one embodiment, the operating system is the Solaris operating system. The backup storage system also includes a network interface module 114c for communicating over the network 108 and a storage system interface module 114d for communicating with the storage system 104 via the direct connection 110.

To perform a backup, the client 106 instructs data to be sent from the storage system 104 to the backup storage system 102 via the network 108 or the direct connection 110. To perform a network backup where the client and the backup storage system run different types of operating systems including different Unix types, Windows, and VMS, the client 106 first converts the backup data into file data, e.g., application format from the physical storage level. The actual data file can be communicated over the network 106 to the backup storage unit 116. When it receives the data file, the backup storage system 102 can take the application level data file, e.g., an Oracle database, convert it to an appropriate file system level format for the backup storage system, which can then be converted through the logical volume manager 114b level into physical storage on the backup storage unit 116.

In general, to restore backed up data the client 106 interfaces with the backup storage system 102 via remote procedure calls such that the restore operation is independent from the browse, mark and submit operations, as described below. After browsing a list of objects, e.g., files and databases, that can be restored, the user selects or marks certain files for restoration and then submits the list of marked objects for restoration. The browse and mark functions provide the ability to select for restore the history of backed up objects representing file systems and databases. These objects are hierarchical and can be navigated by the user or client application. The history of backups represents a list of object attributes, volume offsets, lengths, and representations of where the full set of attributes and data can be found. The user then instructs the backup storage system 102 to perform the submitted request(s) for restoration.

Figure 4:
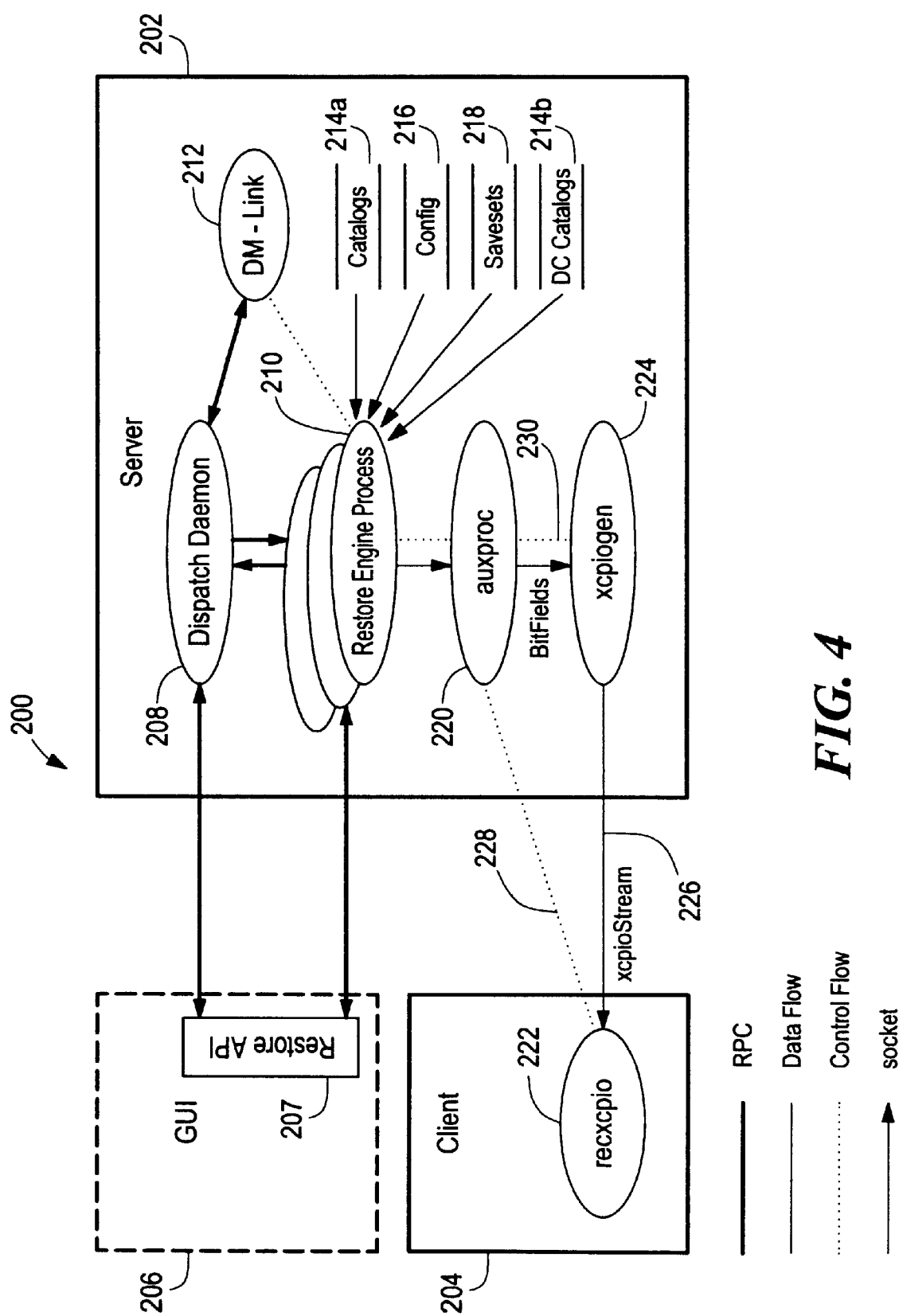
FIG. 4 is a block diagram showing exemplary processes associated with performing independent restore operations in accordance with the present invention.
Figure 5:
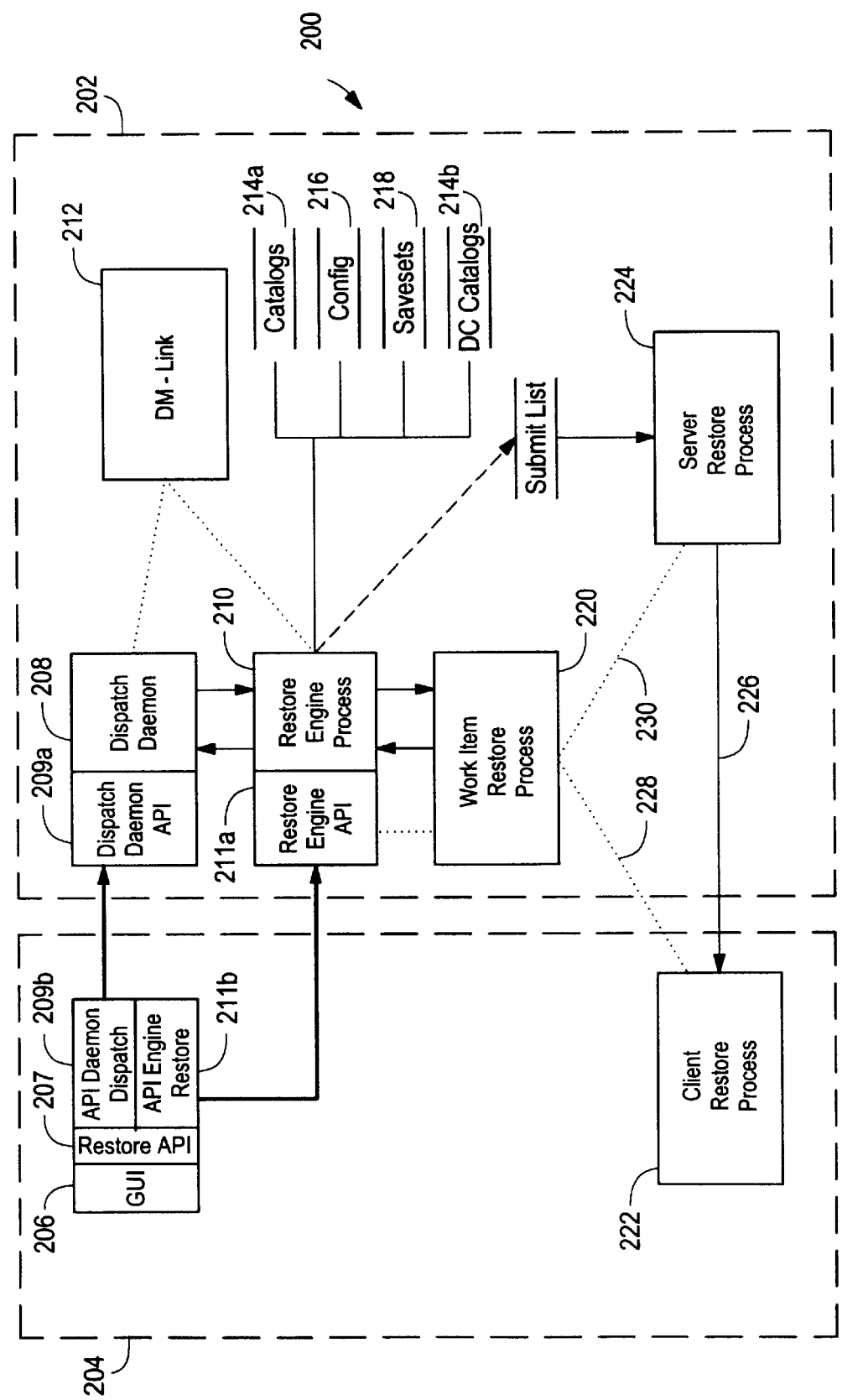
FIG. 5 is a further block diagram showing processes associated with performing independent restore operations in accordance with the present invention.

FIGS. 4 and 5, in which like elements have like reference designations, show an exemplary restore system 200 architecture in accordance with the present invention. The restore system 200 can be implemented on a backup storage system or server 202 as part of the backup/restore module 114a of FIG. 3. The restore system 200 controls the restoration of backed up data from one or more physical storage devices, e.g., tape drives, as requested by a client 204. A graphical user interface (GUI) 206 can be resident on the client 204 or the server 202, for example, to allow a user to browse, mark, submit, and execute restoration of backed up objects, as described in detail below. The GUI 206 can include a restore application program interface (API) 207 for interfacing with the server 202.

A dispatch daemon 208 running on the server waits for requests from the user, via the GUI 206, to create a restore session. In response, the dispatch daemon 208 initiates a restore engine process 210 for each client session in conjunction with a data management (DM) service layer or link 212. Thus, multiple restore engine processes 210 can be concurrently executing on the server 202. The DM service link 212 generates processes on behalf of other processes so as to be a service broker for applications running on the server. In one embodiment, the data management link 212 is similar to the Unix remote command daemon.

Like the dispatch daemon 208, the restore engine process 210 interfaces with the client 204 via the GUI 206 through remote procedure calls (RPCs). The restore engine process 210 interfaces with a catalog system including network or legacy catalogs 214a and direct connect (DC) catalogs 214b, a configuration database 216, and a savesets database 218. Catalogs contain information and attributes for backed up items associated with a particular backup method and physical storage device. In addition, catalogs are associated with a particular library, as described below. The configuration database 216 can include, for example, information regarding what data is to be backed up, which clients are to be backed up, which files are to be backed up, where to store the backed up data, and when to backup the data. The savesets database 218 can include information to keep track of performed backups.

In general, the restore engine displays hierarchical top level objects that can be selected for restore from a previous backup. Each top level object has a history that is stored in application specific catalogs and configuration databases. The history of catalog configuration is browsable, markable and submittable in a predetermined manner that includes incorporating the application specific catalogs.

The restore engine process 210 invokes a work item restore process 220, which creates a client restore process 222 and a server restore process 224. In one embodiment (FIG. 4), the work item restore process 220 corresponds to the Unix auxproc process, the client restore process 222 corresponds to the, recxcpio process, and the server restore process 224 corresponds to the xcpiogen process. This arrangement generates a xcpio data stream 226 of restore data including file attributes and data from the backup storage unit 116 (FIG. 3) to the client 204. The auxproc process 220 receives respective control flow information 228,230, e.g., errors, completion, etc., from the client recxcpio process 222 and the server xcpiogen process 224. As used herein, a work item restore triangle refers to the three processes (auxproc, recxcpio, xcpiogen) associated with a work item restore.

It is understood that a work item refers to a portion of data stored on media. One or more work items can form a part of a file system, a database, or a tablespace within a database. A database, for example, would generally include many work items. In some instances, the top restorable object may be contained in multiple work items as the system divided the backed up objects into multiple streams of data written to different sets of media. This so-called data striping allows for faster backup and restore times for large top level objects. Typically, work item attribute and then data is sequentially written to the same set of volumes.

As best shown in FIG. 5, the dispatch daemon 208 and the restore engine process 210 have respective server and GUI application program interfaces (APIs) that allow communication between the components via remote procedure calls (RPCs). More particularly, the restore engine process 210 communicates via a server API 211a and a client API 211b. Similarly, the dispatch daemon 208 communicates via respective server and client APIs 209a,b.

Figure 6:
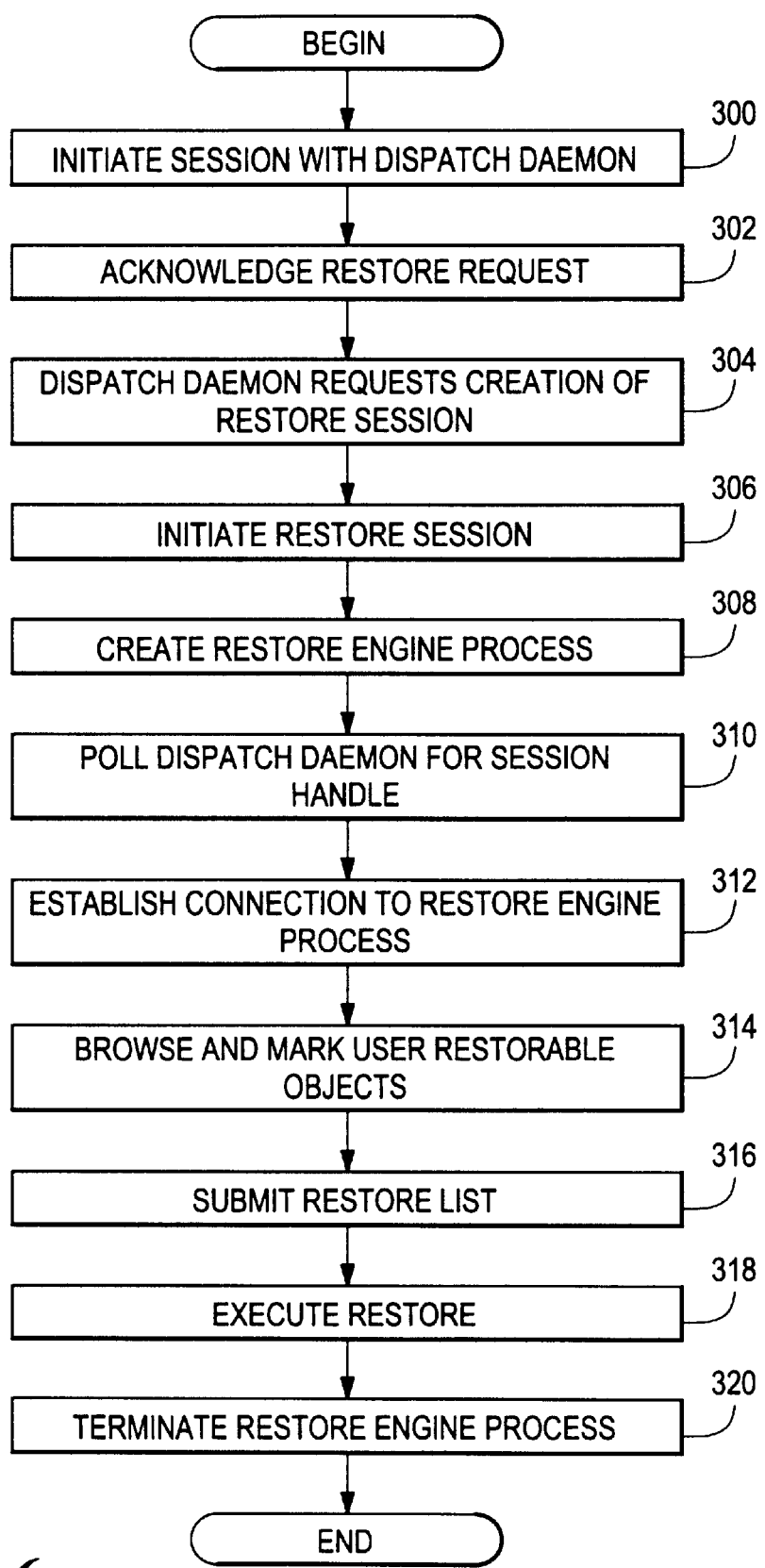
FIG. 6 is a flow diagram showing an exemplary sequence of steps for performing an independent restore operation in accordance with the present invention.

FIG. 6, in combination with FIGS. 4 and 5, show a top level flow diagram of a restore operation in accordance with the present invention. In step 300, a user utilizes the GUI 206 to initiate a restore session with the dispatch daemon 208 via the restore API 207. The dispatch daemon 208 acknowledges the restore request in step 302. In step 304, the dispatch daemon 208 requests that a restore session be initiated via the DM link 212. The DM link then creates the restore session in step 306 and generates a restore engine process 210 in step 308.

In step 310, the restore API 207 polls the dispatch daemon 208 for a session handle, i.e., communication port. After receiving the session handle, the restore API 211a passes the session handle to the GUI 206 to establish a connection with the restore engine process 210 in step 312. In step 314, the restore engine process 210 provides restorable object information to the GUI 206 for allowing the user to browse and mark restorable objects. The user then submits the list of objects to be restored in step 316. In response to a command from the user, the restore engine process executes the restore in step 318. Upon completion of the restore, the restore engine process is terminated in step 320.

As noted above, the restore operation is not executed until commanded by the user. Upon receiving instructions to execute one or more submitted restore requests, the restore engine process creates a restore triangle for each work item. It is understood that there is one restore triangle created for each work item restoration. More particularly, the restore engine 210 creates the auxproc process 220 after receiving a user command to execute a previously submitted request to restore objects marked for restoration. The recxcpio process 222 and xcpiogen process 224 are initialized to generate the stream of backed up data (xcpio) to restore the data to the client 204.

Figure 7:
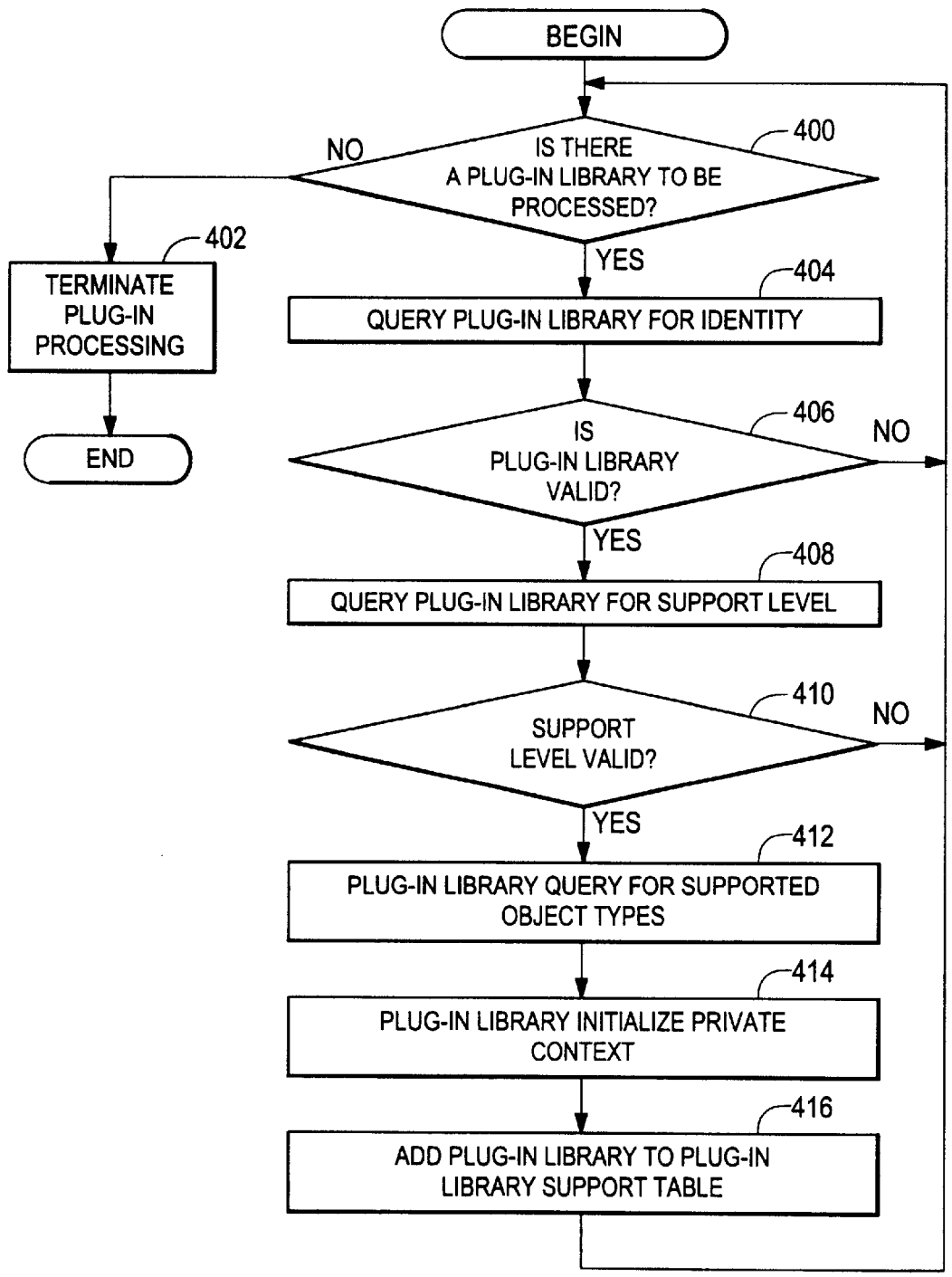
FIG. 7 is a flow diagram showing an exemplary sequence of steps for identifying libraries associated with backed up data that can be restored.

FIG. 7 shows an illustrative set of steps for providing independent restore capability in accordance with the present invention. In general, libraries to support additional catalogs associated with new backup methods and new data storage types can be added with minimal overall impact on the restore system. Catalogs contain information associated with backed up data, such as media type, meta data to enabling browsing, bitfile lengths, and rename attributes for a restore. Each catalog is supported by a library that interprets the catalog information and passes it to the restore engine process in an expected format. The architecture of the restore system allows new storage architectures to be supported by existing backup storage systems by adding an associated library in a predetermined location, such as a library directory. The added library provides the catalog information for new types of objects to the restore engine in a usable manner.

In step 400, it is determined whether there is a plug-in library to be processed. More-particularly, as part of the restore engine initialization process libraries are identified and queried, as described below. If there are no libraries to be processed, in step 402 processing is terminated. If there is a library to be processed, in step 404 the target library is queried for its identity. In step 406, it is determined whether the library is valid. If the target library is invalid, it is determined whether there is a further library to be processed in step 400. If the library is valid, in step 408, the library is queried to determine the library support level. If the support level is invalid, it is determined whether further plug-in libraries need to be processed in step 400. If the library support level is valid, the library is queried for supported object types in step 412. In step 414, the library is initialized with private context. The library is then added to a library support table in step 416.

Figure 7A:
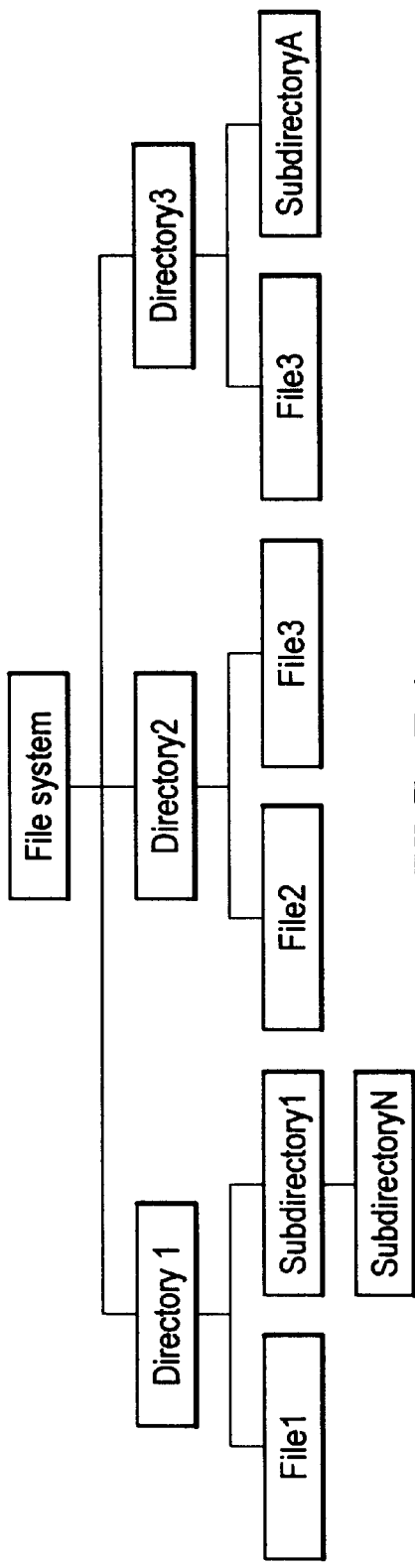
FIG. 7A is a pictorial representation of an exemplary file system that can be restored in accordance with the present invention.
Figure 7B:
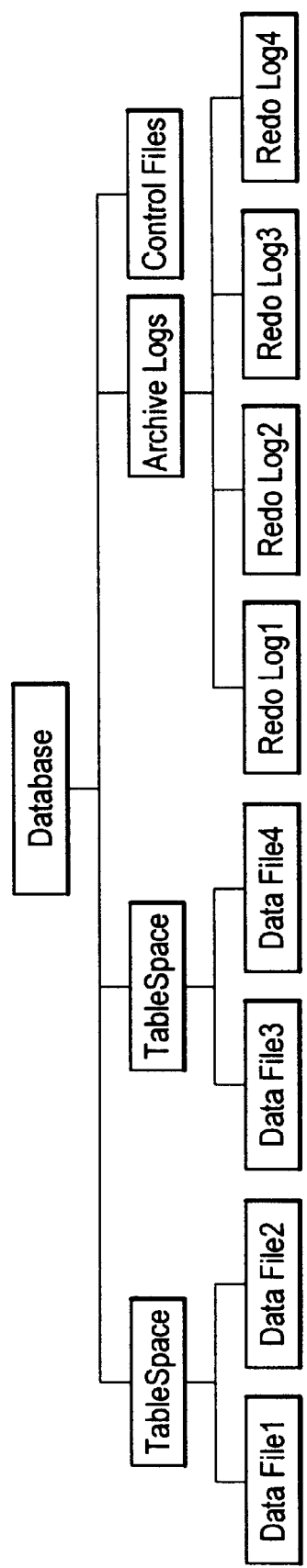
FIG. 7B is a pictorial representation of an exemplary database structure that can be restored in accordance with the present invention.

The libraries provide information contained in the catalogs of backed up data to the restore engine process 210 for allowing a user to browse and mark files for restoration via the GUI 206. In general, the user should be provided with a list of objects that can be restored in a hierarchical manner. For example, entire directories and databases, as well as tablespaces and data files can be displayed to a user for browsing and marking. FIGS. 7A and 7B show an exemplary file system and a database structure, respectively.

Figure 8:
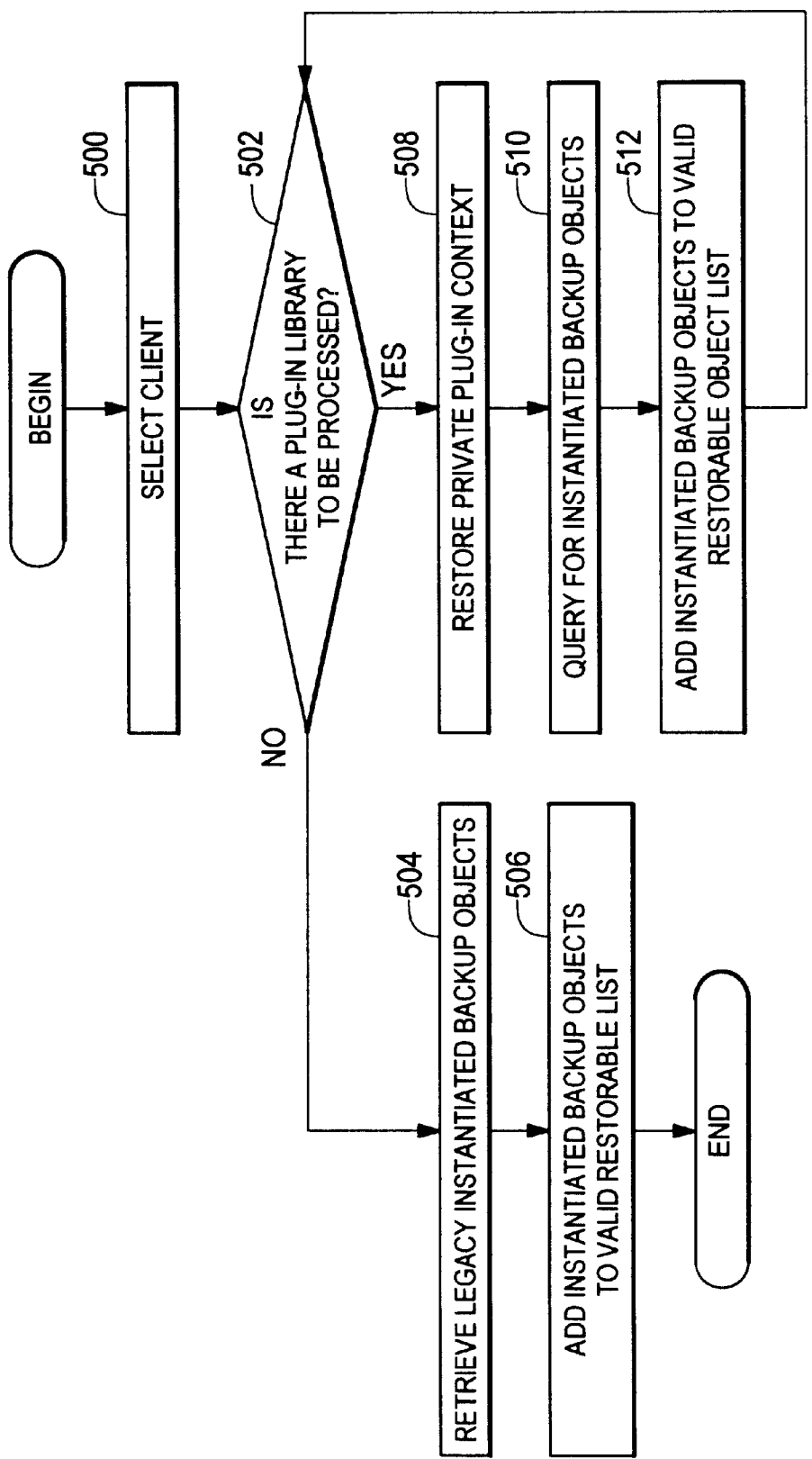
FIG. 8 is a flow diagram showing an exemplary sequence of steps for providing a list of restorable objects to a user.

FIG. 8 shows an illustrative set of steps for providing a list of valid restorable objects for browsing by a user as part of the restore process. It is understood that valid restorable objects refer to work items, e.g., files, tablespaces, and datafiles, that were previously backed up and are available for restoration. In step 500, a client is selected to which data will be restored. It is understood that one client, which can be controlled by a system administrator for example, can request data to be restored to a plurality of other clients. It is further understood that a particular client may have a limited ability to restore backed up data as is well known to one of ordinary skill in the art. In step 502, it is determined whether there is a library to be processed. If no libraries are to be processed, in step 504 network or legacy backup object information is retrieved. In step 506, the retrieved legacy backup object information is added to a list of valid restorable object that can be displayed for browsing by the user. It is understood that each valid restorable object is associated with a particular library.

If there is a plug-in library to be processed, in step 508 the environment for the plug-in library is re-instantiated. In step 510, the library is queried for instantiated backup objects, and in step 512, the instantiated backup objects are added to the list of valid user restorable objects. The list of restorable objects is determined from the information in the catalogs, which is provided to the restore engine process in a predetermined format.

In one embodiment, the user can browse and mark direct connect objects and network objects. It is understood that direct connect objects refer to data backed up via a direct connection between a storage system associated with a client and a backup storage system, as described above in conjunction with FIG. 3. Direct connect objects can be associated with a direct connect library that defines the attributes of the data backed up over the direct connection. For example, the direct connect library can export direct connect report (DCRPT) and discovery data table (DDTAB) information to the restore engine process 210 (FIGS. 4 and 5). The DDTAB file is discussed more fully in the '294 patent cited above. Network or legacy objects refer to data backed up over the network.

In general, there are three phases of processing associated with the submitted request: pre-script processing, execution processing, and post-script processing. To to support pre and post script processing, the user can be queried via the GUI for specific information, as described below. As known to one of ordinary skill in the art, pre-script processing refers to options selected by the user prior to executing the restore. The user options can be received in response to queries. Exemplary pre-script processing queries include whether mirrors are to be broken, the destination for the restored data, and restore set up information. Post-script processing queries can include whether to re-establish mirrors and the location from which data should be restored.

In one embodiment, a query object is created in response to a restore request submitted by the user. The restore engine process can build the query object based upon information provided by the application, such as breaking mirrors, via an application specific library call. The query object can contain questions for the user, valid answers, default answers, and required user actions.

FIG. 8A shows an exemplary embodiment in which the restore engine interacts with the GUI and the preparation/cleanup processes to obtain required information from the client. The preparation or cleanup processes provide messages, such as structured messages or query objects, to the restore engine, which passes the message to the GUI. The GUI presents the embedded question to the user and waits for a response. The GUI then passes the user's answer back to the restore engine, which then provides the information to the preparation/cleanup phase.

Figure 9:
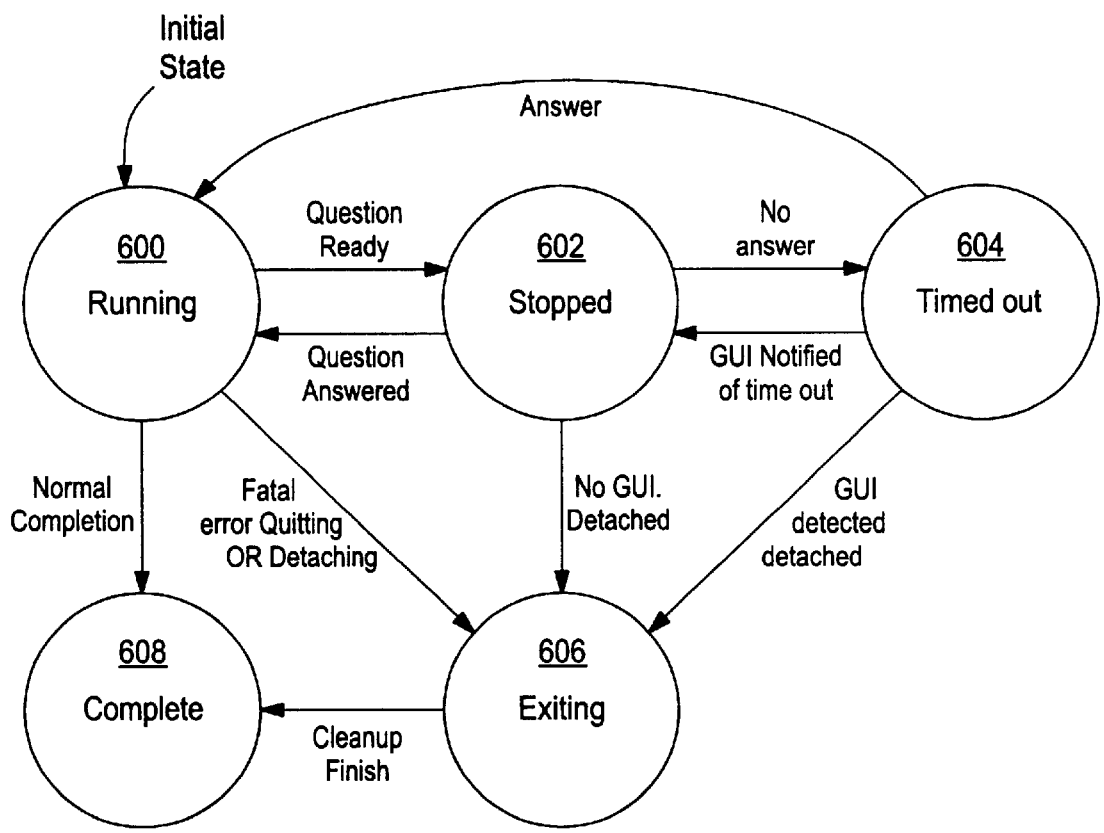
FIG. 9 is a state diagram showing states associated with restoring data in accordance with the present invention.

FIG. 9 shows an exemplary state diagram showing valid restore engine states associated with pre-script or initialization processing and post-script or clean-up processing. The states can be provided to the GUI and displayed to inform the user of the current state.

The restore engine 210 (FIG. 4) intially enters a running state 600 upon executing a submitted restore request. When the user is to be asked a question, the stopped state 602 is entered for a predetermined amount of time. If the user does not respond within the allotted time, the timed out state 604 is entered. The user is notified of the time out and the stopped state 602 is re-entered. If the user answers the question, such as by responding to a dialog box, within a further predetermined amount of time, the restore engine process returns to the running state 600. If the user does not answer, the user is considered detached and the exiting state 606 is entered in which the requisite clean up is performed. The completed state 608 is entered from the running state upon normal completion or from the exiting state 606 after an unsuccessful restore, e.g., fatal error or GUI detached.

The question and answer capability provides a generic description to allow a facility to pose questions to a user via the GUI. This arrangement allows new self-describing components, e.g., plug-ins, to be added without modifying interfaces. In one embodiment, a remote procedure call (RPC) interface can be provided as a sub-service of the restore engine process. In the restore process, an application or plug-in can supply questions to the restore engine process.

In one embodiment, the backup storage system supports multiple work item restores. The restore engine process 210 manages multiple restores, which can be requested by different users, with one user per restore engine process. The restore engine process creates the "restore triangles" after browsing and marking are complete and the restore request is submitted. The restore engine process monitors progress of the restore triangles.

Figure 10:
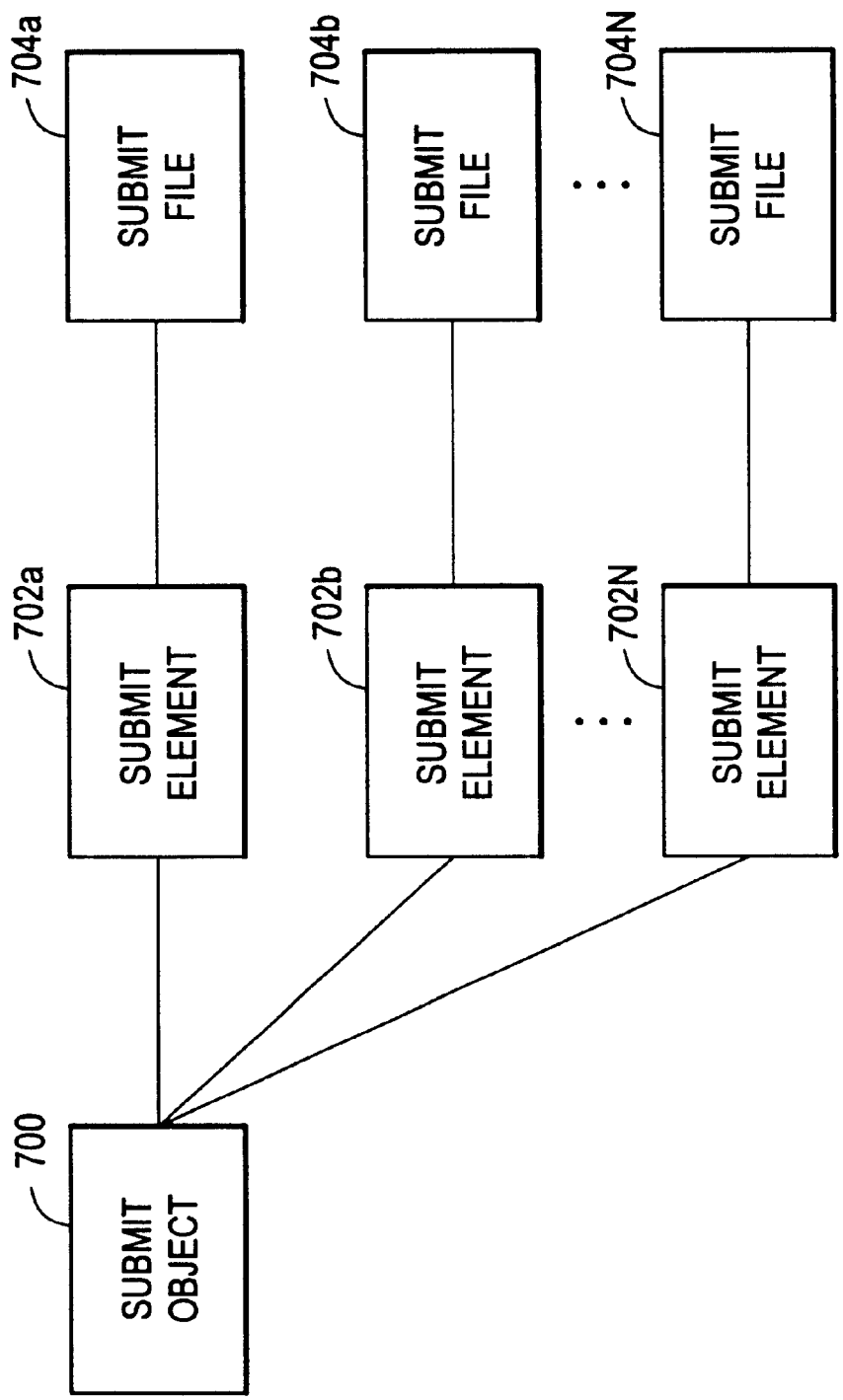
FIG. 10 is a block diagram of a submit object in accordance with the present invention.

In another aspect of the invention illustrated in FIG. 10, persistent submit objects 700 are created based upon the marked items submitted by the user for restoration. In general, the restore engine extracts information needed for the restore from the library catalogs associated with the marked objects to generate the submit objects. The submit objects include one or more submit files containing the extracted information. The submit files can be read during the restore execution. In addition, restore execution of the work items contained in the submit objects can be scheduled based upon the volumes and volume availability. The submit objects are typically generated prior to the execution process, such as in response to submission of a restore request.

Each submit object 700, one for each execute restore request, encapsulates sufficient information to initialize, execute, and cleanup the restore operation. A plurality of submit elements 702a-N can correspond to each submit object 700. Each submit element 702 provides the details, e.g., media location, size, and media type, for how the corresponding submit files 704 are to be restored. As described above, this information is extracted from the library catalogs. Each submit file 704 has a one-to-one correspondence with a submit element 702.

The submit objects 700 can include query objects associated with initialization (pre-script processing), execution and cleanup (post-script processing) to be sent to the user prior to restore execution. For example, initialization can include shutting down a database prior to executing the restore and cleanup can include recovering the database to bring it back online.

The submit elements 702 each contain information, e.g., a list of bitfiles, associated with running a work item restore triangle (auxproc/xcpiogen/recxpio). That is, the submit element contains information for creating the client and server side processes for reading backed up data and restoring the data to the client. Each submit element 702 corresponds to one work item. The submit element 702 can contain bitfile information, file lengths, directory indicators, rename attributes, destination information, e.g., target host, connection type, protocol, overwrite policy, and media information, e.g., volume on which data to be restored is located. This information can be extracted from the data management catalogs and written to the submit file 704 associated with the submit element.

The submit file 704 can specify the bitfiles that are to be read for generating the xcpio data stream to the client. More particularly, the submit file 704 can include bitfile ids, file size, file type, and client side processing information. The submit object and corresponding submit element and submit files along with the preparation and cleanup directives provide all the information needed to execute a restore. This arrangement provides functional separation of browse, mark, and submit from the restore execution.

Figure 10A:
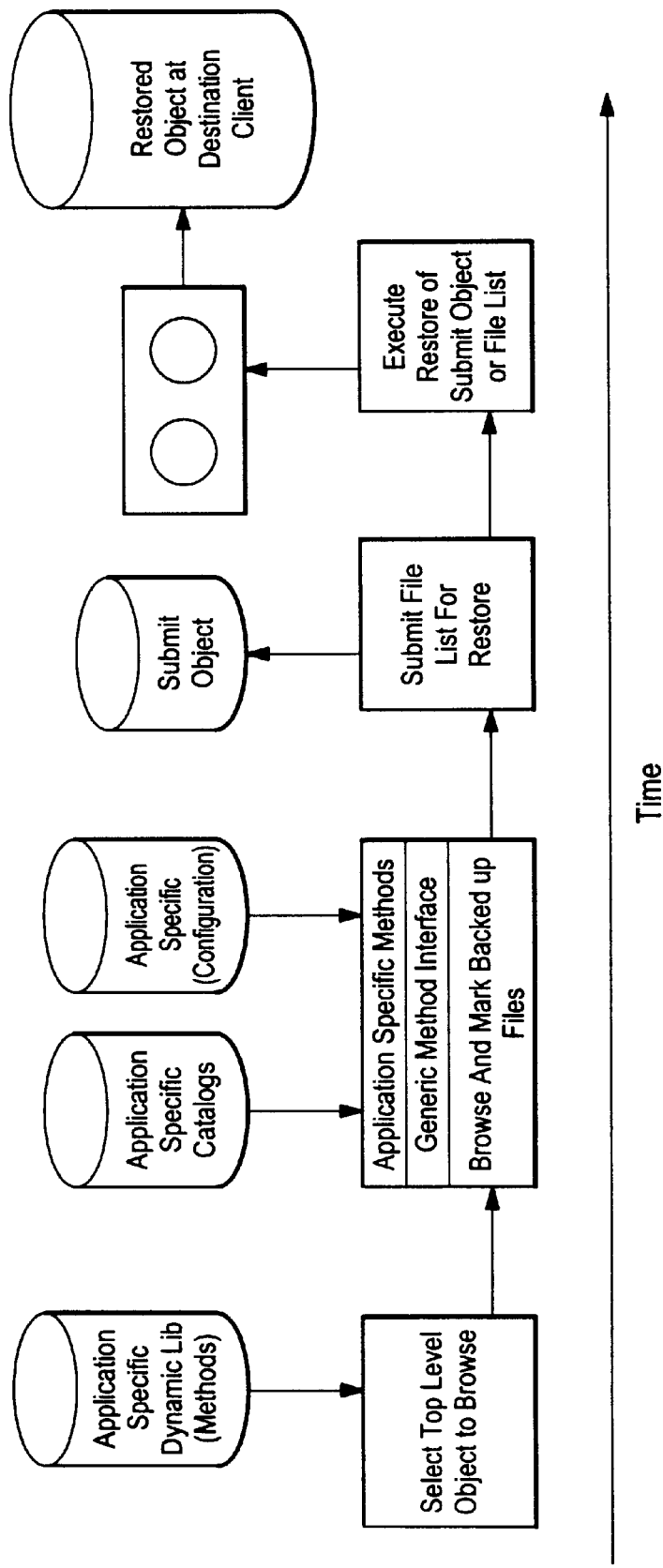
FIG. 10A is a pictorial representation of data restoration over time in accordance with the present invention.

FIG. 10A shows an illustrative restore over time in accordance with the present invention. The user first initiates a restore session that loads application specific libraries as described above in FIG. 7. The user can then select top level objects for browsing. As the user marks certain objects for restoration, application specific catalog and configuration information is provided to the restore engine via a generic interface, as discussed in conjunction with FIG. 8. Based upon the marked objects, the restore engine extracts file lists, e.g., attributes and volume information, and generates persistent submit objects. The submit objects have corresponding submit elements and submit files as shown in FIG. 10. When commanded by the user, the restore engine executes restore(s) based upon the information encapsulated in the persistent submit objects. That is, the restore engine retrieves data from the media and ultimately provides it to the specified client location.

Figure 11:
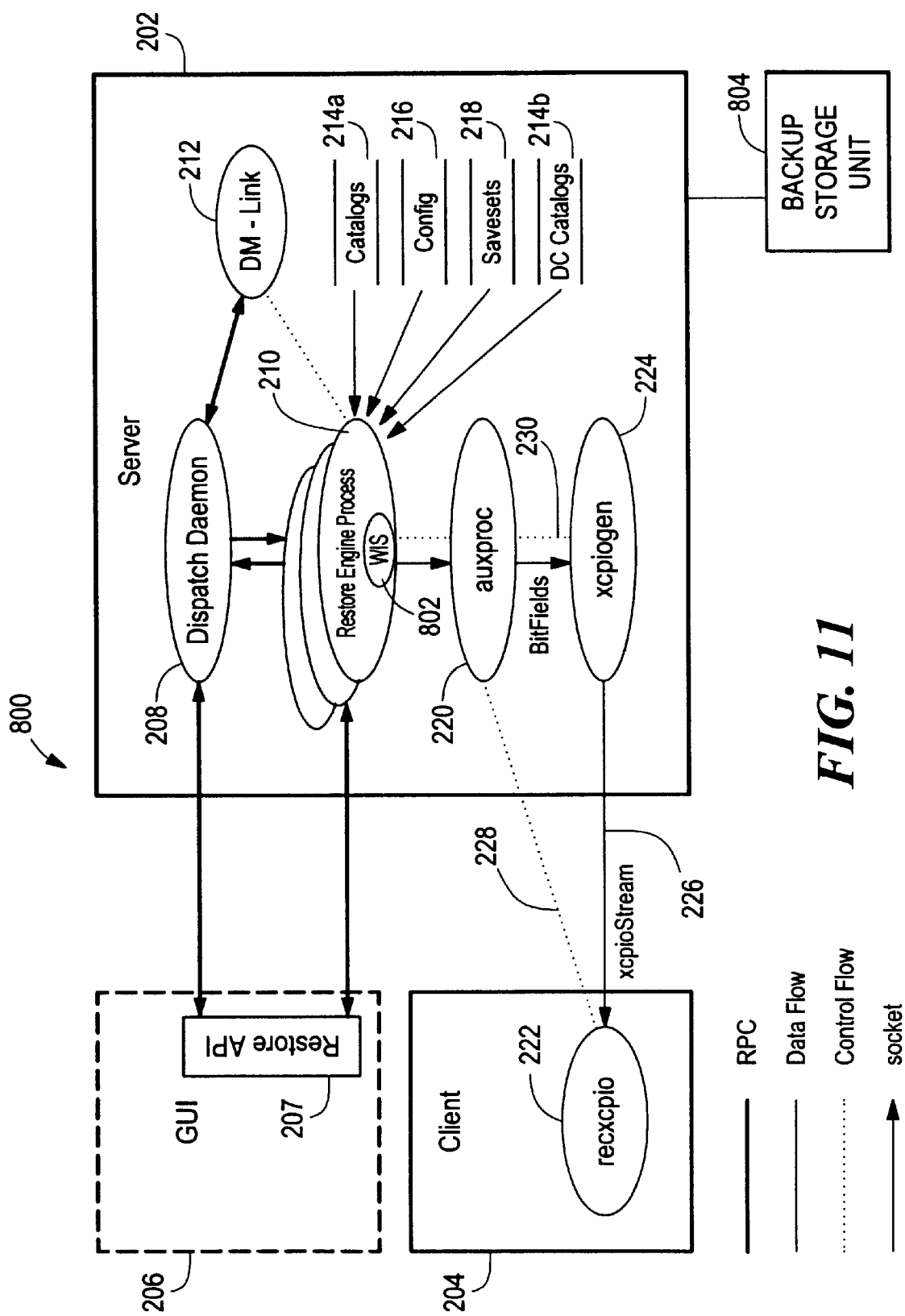
FIG. 11 is a block diagram showing a work item server in accordance with the present invention.

FIG. 11 shows a backup and restore system 800 that optimizes the execution of multiple restore operations in accordance with the present invention. The system 800 can be similar to the system 200 show in FIG. 4 and can further include a work item server 802 for controlling the restoration of data from media, e.g., tapes, in the backup storage unit 804. As used herein, the work item server 802 refers to a portion of the restore engine that controls certain work item restore details. In general, the work item server 802 defines a plurality of trail queues based upon the tape sets, i.e., volumes, that must be accessed to restore the work items contained in the submit objects. Each work item corresponds to one of a plurality of trail queues. As described above, the submit objects 700 (FIG. 10), which include submit elements 702 and submit files 704, contain the information required restore the work items marked for restoration by the user.

Figure 12:
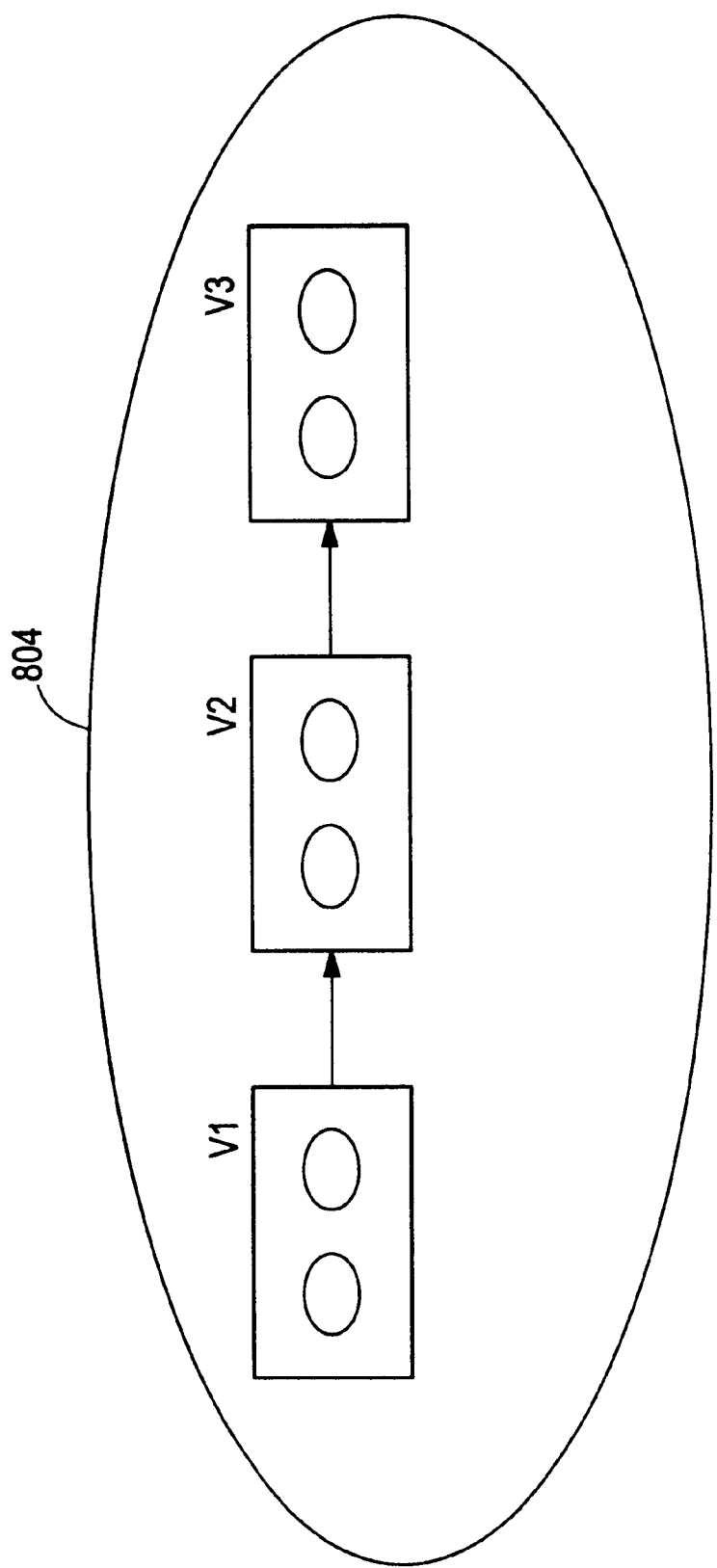
FIG. 12 is a schematic representation showing a work item spanning multiple volumes.
Figure 13:
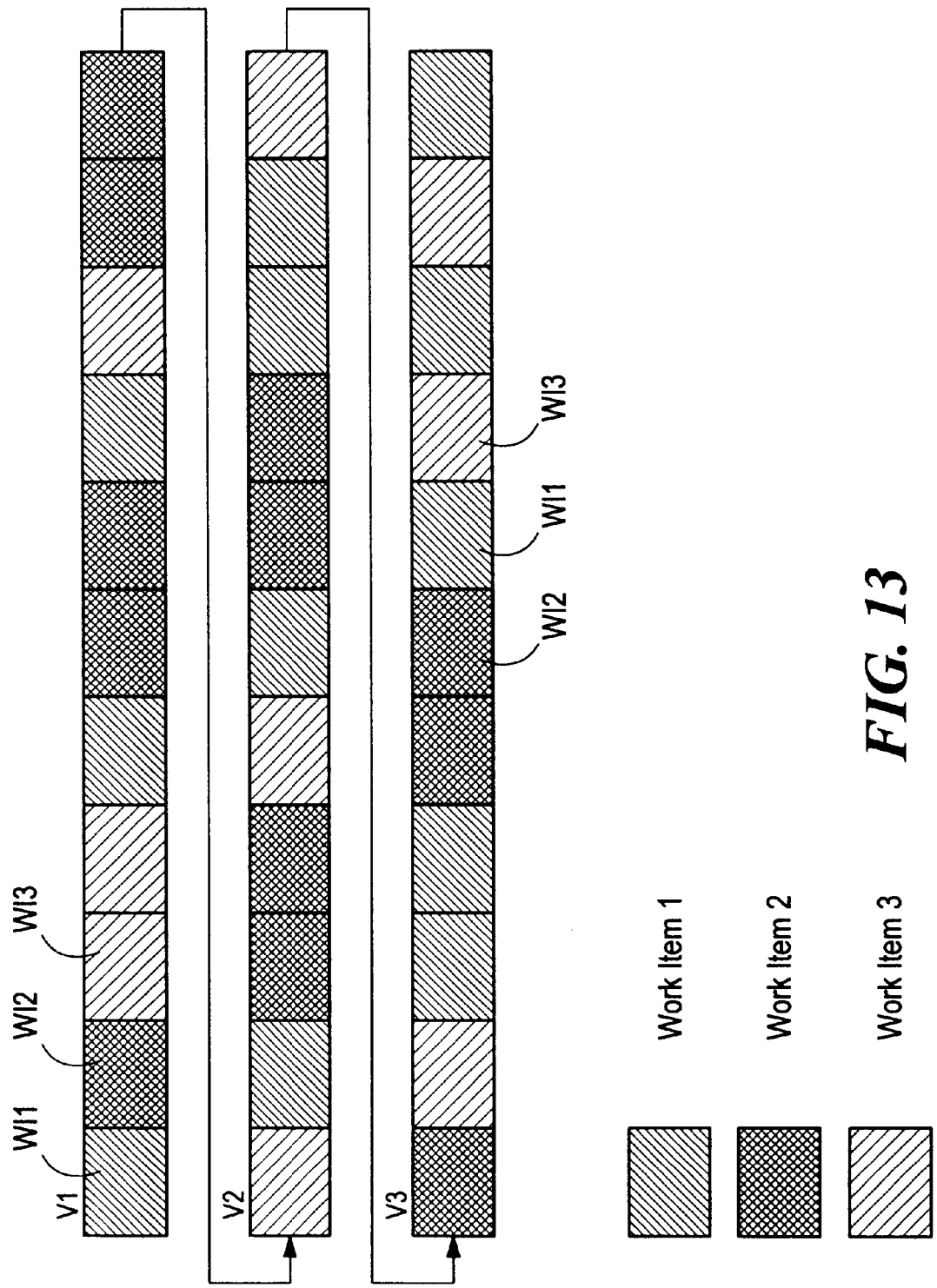
FIG. 13 is a schematic representation.

FIG. 12 shows a portion of a backup storage unit 804 having a series of volumes V1,V2,V3, e.g., tapes, from which backed up data is restored. The data, i.e., work items, are written sequentially to the media volumes during the data backup process. A single work item can span several volumes as shown in FIG. 13. More particularly, during the backup process multiple work items WI1,WI2,WI3 can be written to multiple volumes V1–3 in a multiplexed manner. As known to one of ordinary skill in the art, metadata can be written to the media as more than one data stream, i.e., work item, is written to the tape. The metadata allows for each written stream to be identified with the data records on the media.

Figure 14:
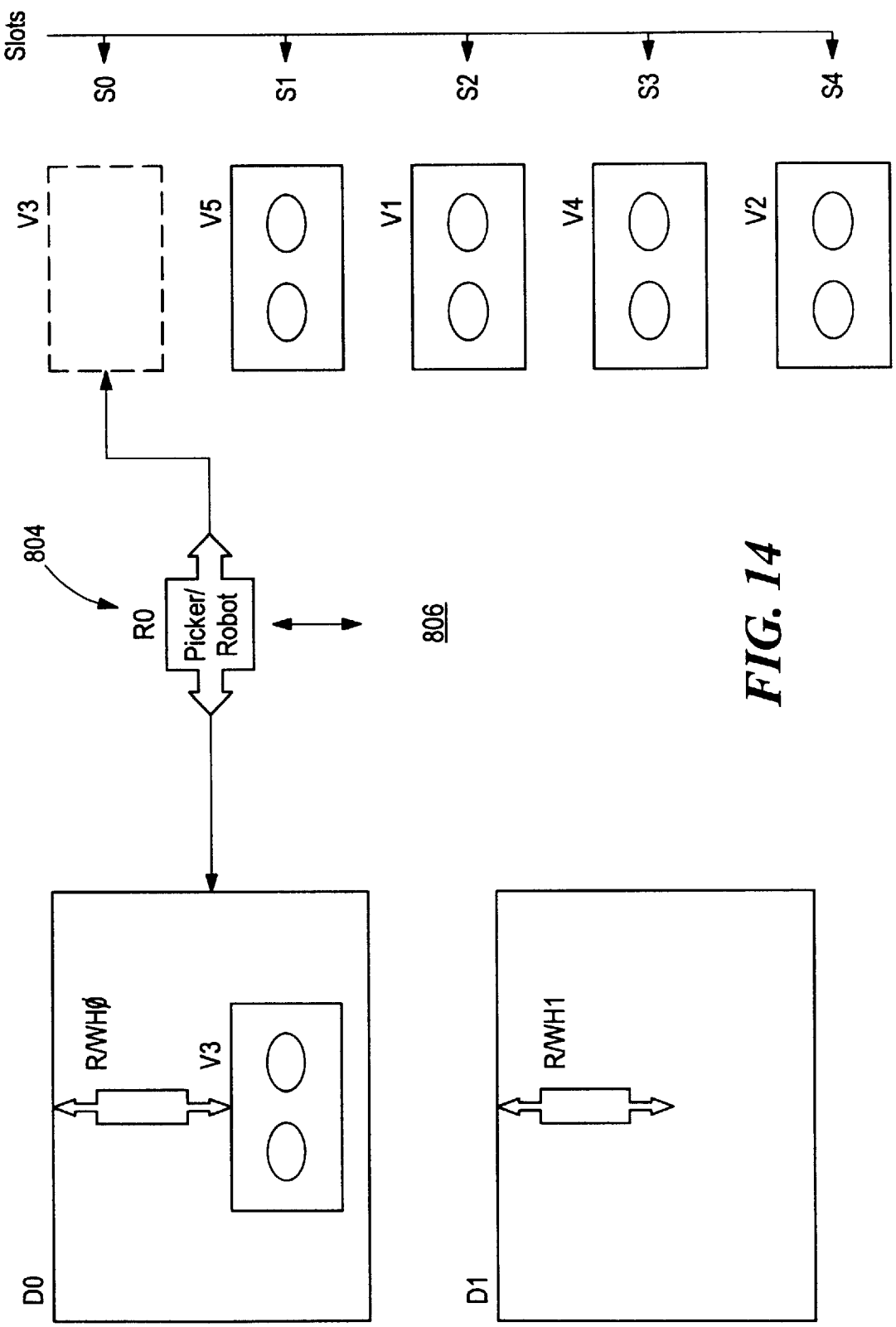
FIG. 14 is a schematic representation of a read/write subsystem for restoring multiple work items in accordance with the present invention.

FIG. 14 shows an exemplary backup storage unit 804 including a read/write subsystem 806 having a plurality of volumes V1–5, each of which has an assigned slot S0–S4. A robotic tape picker R0 places each tape into one of a plurality of drives D0–1. The drives D0–1 read and write data on the tape with a respective read/write head R/WH0–1. Read/write systems having automated tape insertion are well known to one skilled in the art.

Figure 15:
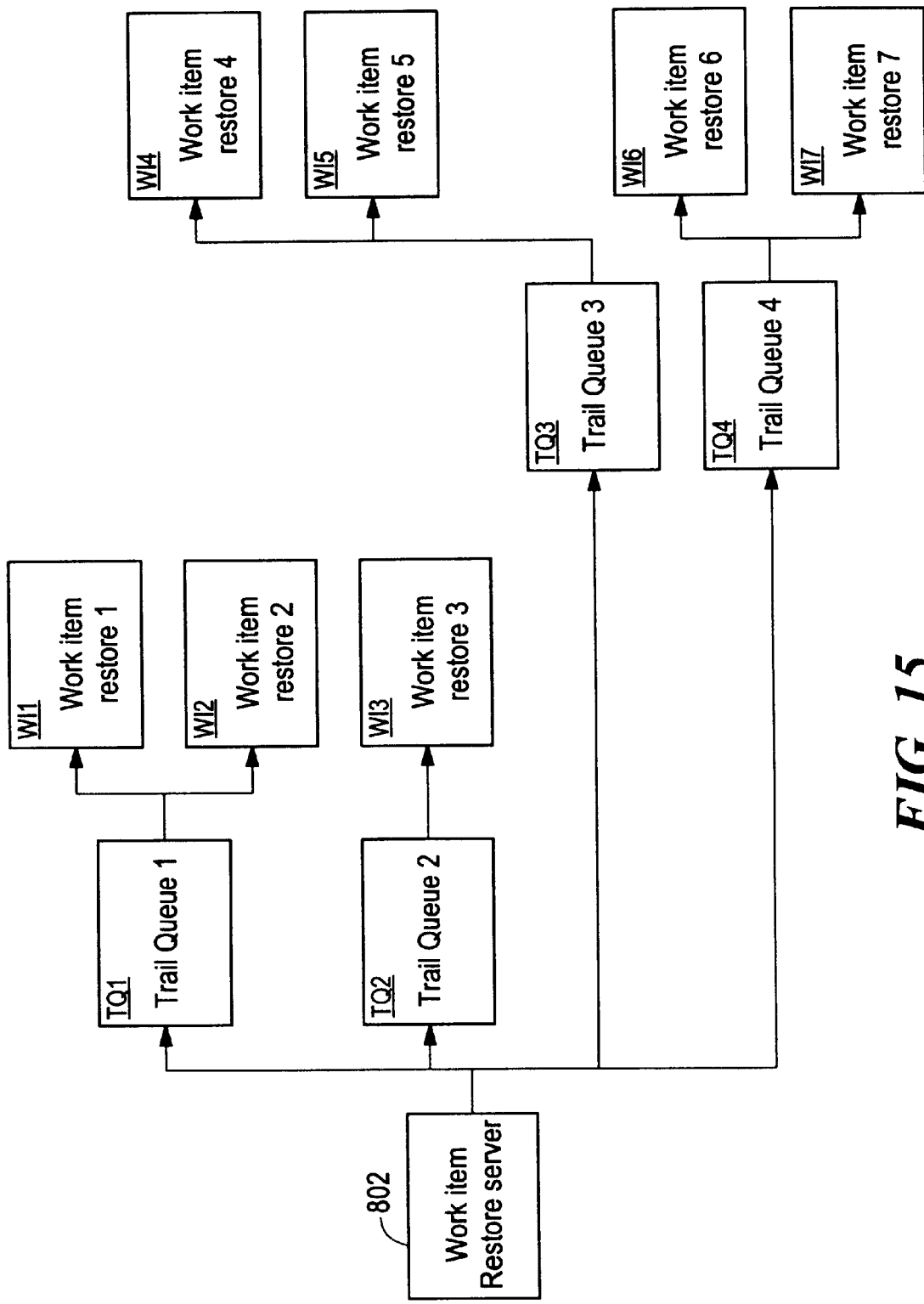
FIG. 15 is a block diagram showing work items assigned to respective trail queues by a work item server in accordance with the present invention.

As shown in FIG. 15, the work item server 802 defines a plurality, e.g., four, of trail queues TQ1–TQ4 based upon the sets of volumes, e.g., tapes, needed to restore a predetermined number, e.g., seven, of work items WI1–WI7 that were marked for restoration by the user. The work item server 802 (FIG. 11) controls restoration of each work item for the trail queues. It is understood that the number of work items and trail queues shown in FIG. 15 is illustrative and will vary based upon a variety of factors including number of work items and volume commonality criteria.

The work item server 802 is allocated a predetermined number of drives to perform the work item WI restorations. In the case where more then one drive is available, the system can restore multiple trail queues simultaneously. In accordance with the present invention, the work item server 802 optimizes the restoration process for multiple work items. In one embodiment, each trail queue TQ is assigned a set of drives until all the available drives are allocated to a trail queue. Each trail queue TQ maintains control over the assigned drive until each work item WI in the trail queue has been restored. As trail queues are completed, the drives are re-assigned to further trail queues that have yet to restore their work items.

Figure 16:
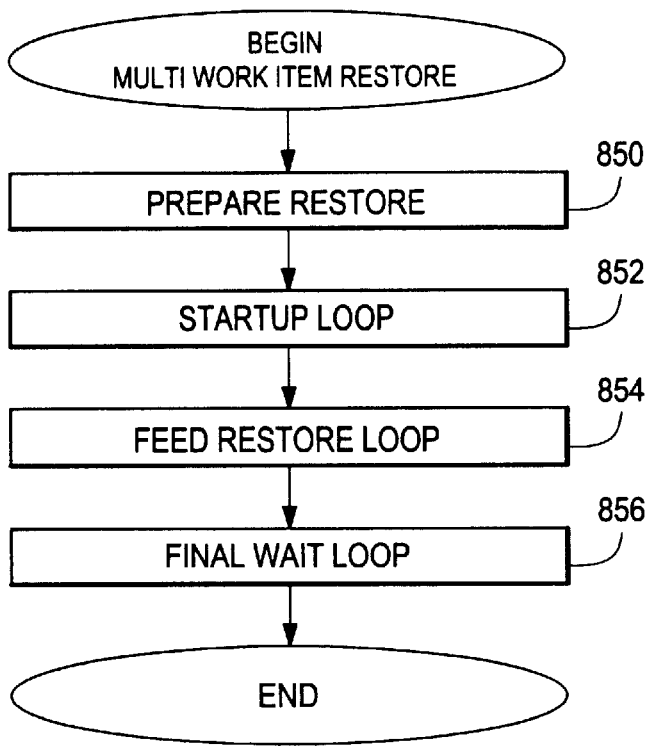
FIG. 16 is a top level flow diagram showing an exemplary sequence of steps for implementing multiple restore operations in accordance with the present invention.

FIGS. 16–20 show an exemplary sequence of steps for optimizing multiple work item restores in accordance with the present invention. FIG. 16 is a high level flow diagram showing exemplary procedures for handling multiple work item restores. In step 850, a prepare restore procedure is run that assigns the work items to respective trail queues, determines the number of drives available, and initializes the system. In step 852, a start up loop is run and in step 854, a feed restore loop is entered. As the process completes, a final wait loop is entered in step 856.

Figure 17:
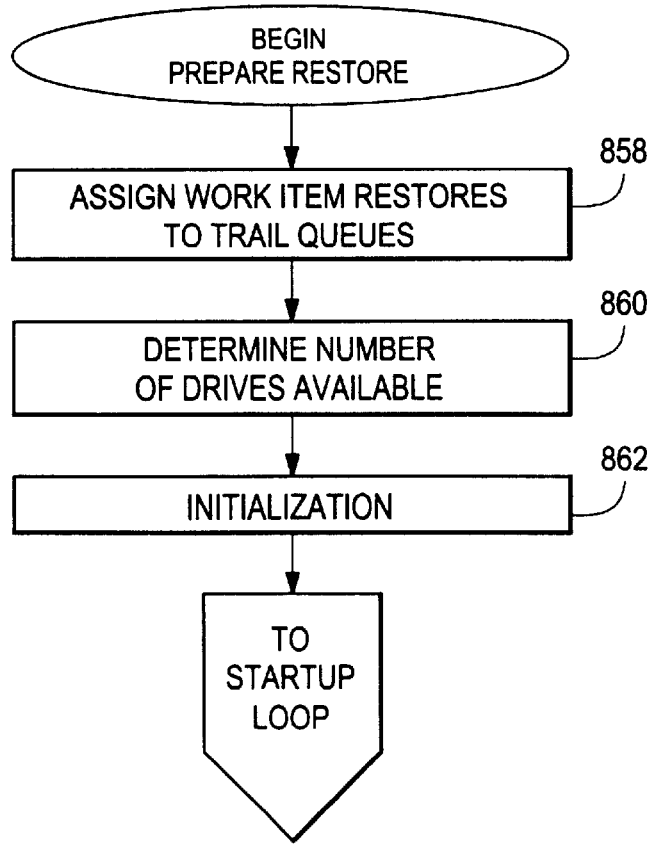
FIG. 17 is a flow diagram showing an exemplary sequence of steps for a prepare restore procedure that can form a part of the flow diagram of FIG. 16.

FIG. 17, in combination with FIG. 15, show an exemplary sequence of steps for the prepare restore procedure. In step 858, the work item server 802 assigns each work item from the submit objects to a respective trail queue TQ. In one particular embodiment, multiple work items WI located on the same set of volumes are assigned to the same trail queue TQ. For example, if the first and second work items WI1, WI2 span the same three volumes, then those two workitems are assigned to the first trail queue, e.g., TQ1, as shown in FIG. 15. It is understood, however, that the assignment of work items to trail queues can be less rigid than requiring the exact same number of tapes. One of ordinary skill in the art can readily define a desired level of volume commonality in assigning work items to trail queues.

In step 860, the work item server 802 determines the number of drives that are available to execute the restoration of the marked work items. The work item server 802 performs some initialization in preparation for the restore execution in step 862 and then proceeds to the startup loop shown in FIG. 18.

Figure 18:
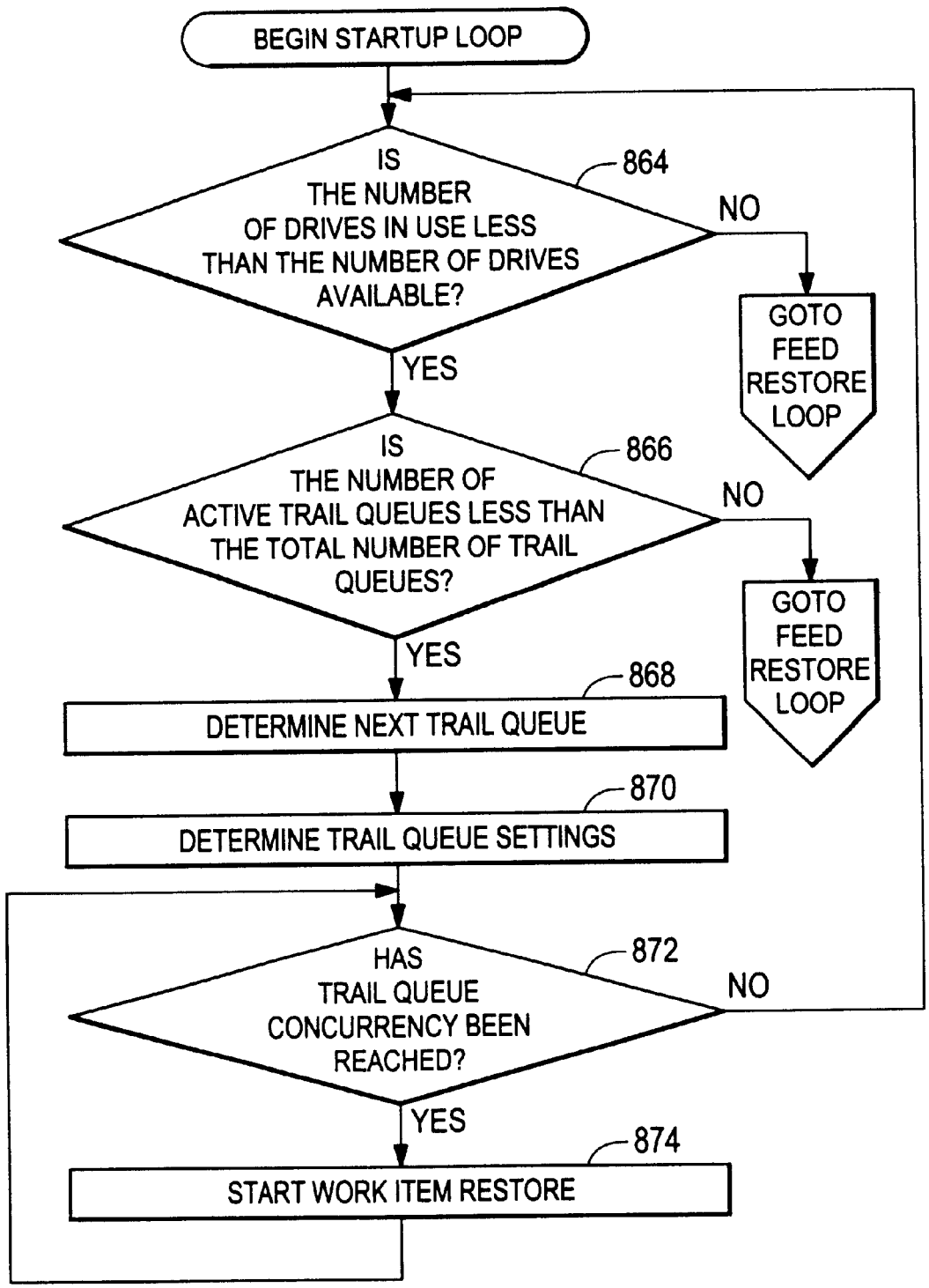
FIG. 18 is a flow diagram showing an exemplary sequence of steps for a startup loop procedure that can form a part of the flow diagram of FIG. 16.

As shown in FIG. 18, the startup loop first determines whether the number of drives currently in use is less than the number of drives available for the restore in step 864. If there are no more drives available, the feed restore loop is entered, which is described in conjunction with FIG. 19. If there are drives available, the work item server determines in step 866 whether the number of active trail queues is less than the total number of trail queues. The work item server can also determine whether the total number of allocated drives has reached the maximum number of drives allocated to the work item server. If not, the feed restore loop is entered. Otherwise, the work item server determines the next trail queue that is to be restored in step 868. In step 870, the settings for the trail queue are determined. More particularly, the trail queue concurrency and the trail queue drive limit are determined. The trail queue concurrency refers to the number of media readers that can read data from a set of volumes at any one time. For example, a trail concurrency of one allows only one work item within the trail queue to be restored at any one time. The trail queue drive limit determines the maximum number of drives that can be allocated to a trail queue. For example, a limit of two allows two drives to be assigned to a trail queue.

In step 872, the work item server 802 determines whether the trail queue concurrency has been reached. If not, the system can determine whether there are additional drives available in step 864. If the concurrency has been reached, in step 874 the work item restore is executed as described above.

Figure 19:
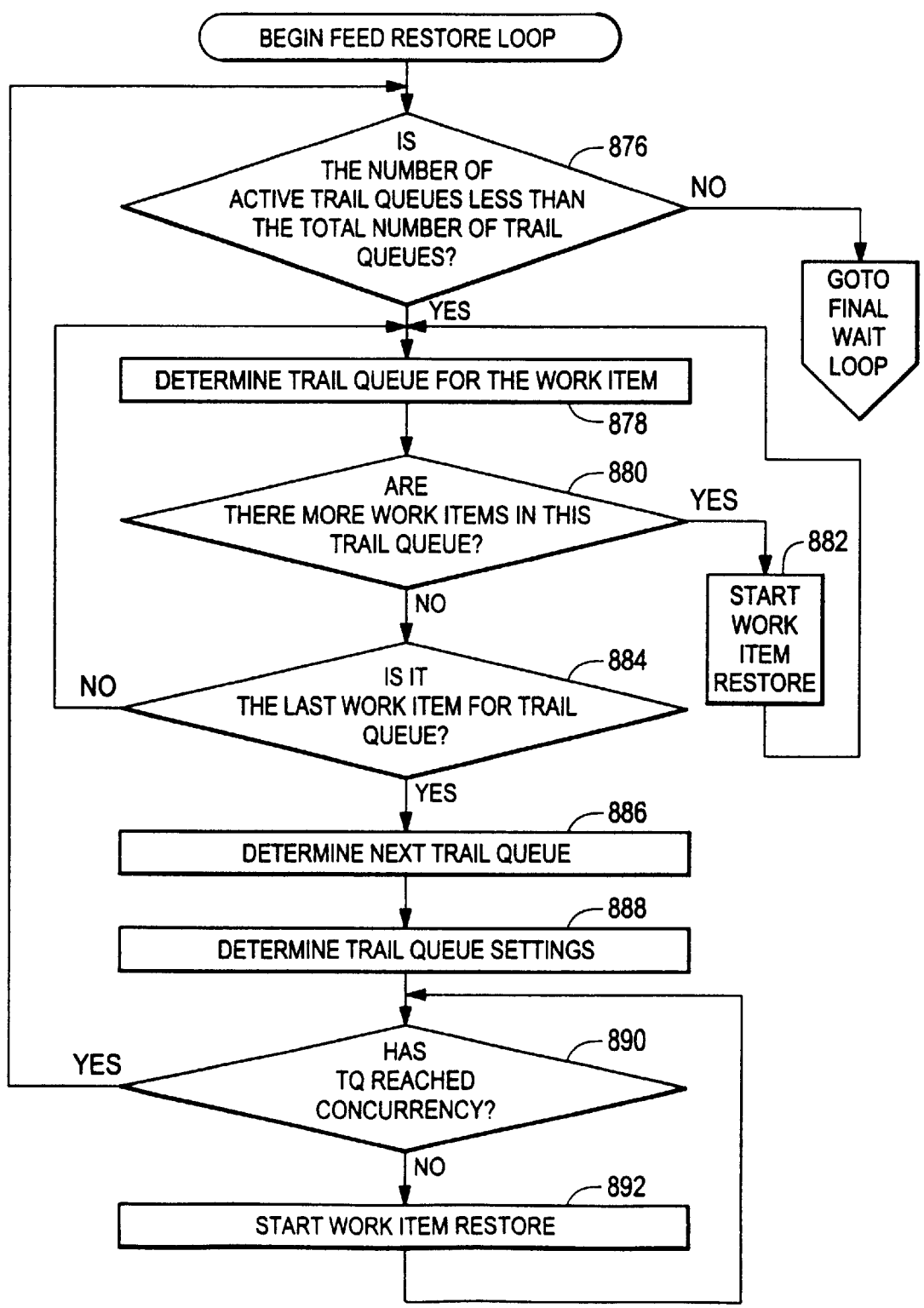
FIG. 19 is a flow diagram showing an exemplary sequence of steps for a feed restore loop that can form a part of the flow diagram of FIG. 16.

FIG. 19 shows an exemplary set of steps for implementing the feed restore loop. It is understood that the feed restore loop may not be entered at all since the feed restore loop handles the case where all the pending work items can not be handled simultaneously. For a limited number of work items and a sufficient number of drives, the work item server can restore all the work items at the same time.

In step 876, the work item server determines whether the number of active trail queues is less than the total number of trail queues. If it is, then the final wait loop is entered, which is described in conjunction with FIG. 20. Otherwise, in step 878, the work item server, after the current work item restore is complete, determines the trail queue to which the work item is assigned. In step 880, the work item server determines whether there are additional work items assigned to that trail queue. If there are further work items, in step 882 the server initiates the work item restore and determines its assigned trail queue in step 878. If there were no further work items in that trail queue, the work item server determines in step 884 whether the running work item restore is the last work item for the trail queue. If not, the work item loops on the above steps 878,880,882 until the work items are restored.

After the last work item for that trail queue has been restored, in step 886 the work item server determines the next trail queue that should be restored, and in step 888 determines the trail queue settings, e.g., concurrency and drive limit. In step 890, the work item server determines whether the trail queue concurrency limit is reached. If not, the work item restore is executed in step 892. If the currency is reached, the work item server examines the number of active trail queues in step 876. When all the trail queues have become active, the final wait loop procedure (FIG. 20) is entered.

Figure 20:
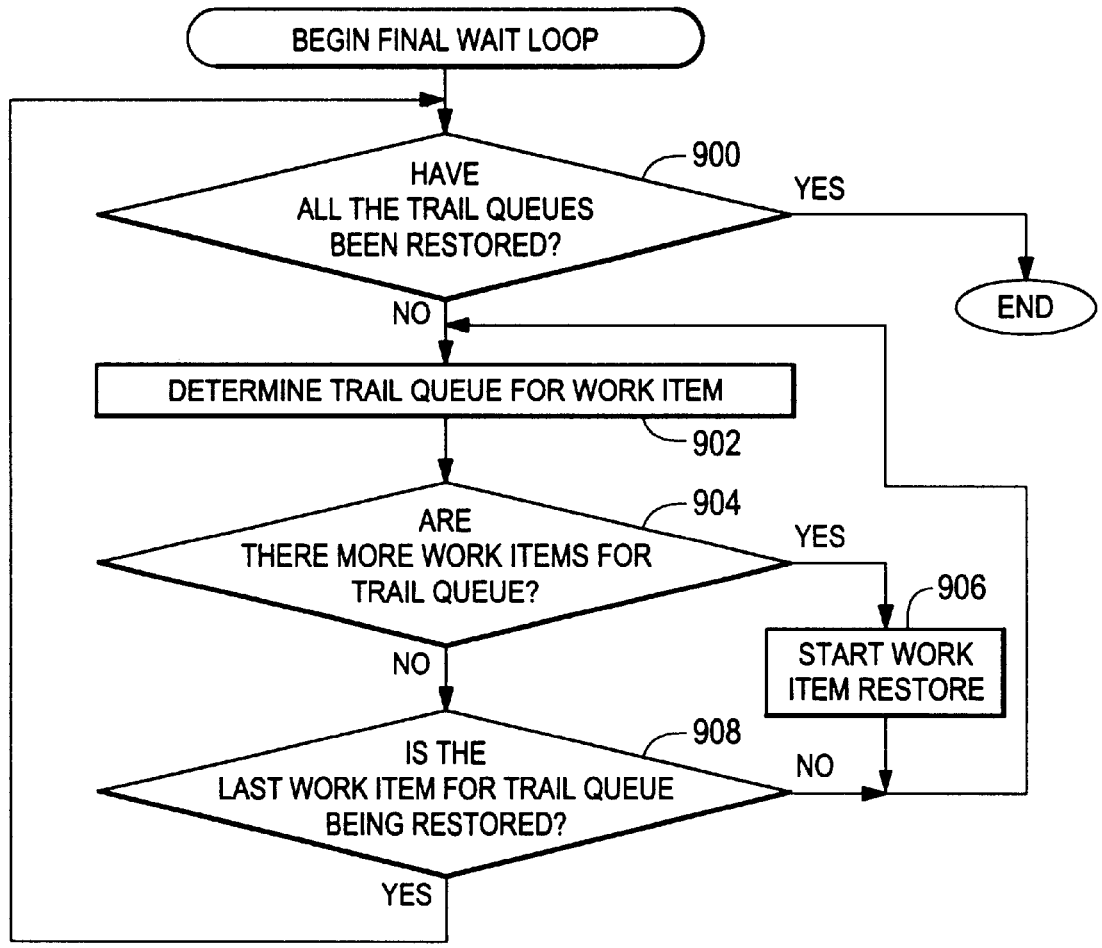
FIG. 20 is a flow diagram showing an exemplary sequence of steps for a final wait loop that can form a part of the flow diagram of FIG. 16.

FIG. 20 shows an exemplary set of steps for the final wait loop. In step 900, the work item server determines whether all of the trail queues have been completely restored. If so, the restore process is terminated. If not, the work item server waits for the running work item restoration to complete and determines the trail queue that is associated with the work item in step 902. In step 904, the work item server determines whether there are additional work items to be restored for the trail queue. If there are additional work items, the next pending work item is restored in step 906. If there were no additional work items, the work item server determines whether the last work item for the trail queue is being restored in step 908. If so, the number of finished trail queues is examined in step 900. If not, the trail queue for the work item is determined in step 902. The final loop continues until each work item in all of the trail queues is restored.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for performing simultaneous work item restores, comprising:
   receiving one or more submit objects each containing a plurality of work items to be restored;
   assigning each of the plurality of work items to one of a plurality of trail queues based upon volume sets on which the plurality of work items are located;
   determining a number of drives available to execute the work item restores;
   allocating the drives to respective trail queues; and
   restoring multiple ones of the work items simultaneously.

2. The method according to claim 1, further including assigning the plurality of work items to respective trail queues based upon a level of commonality of the volume sets on which the work items are stored.

3. The method according to claim 1, further including assigning each of the plurality of work items corresponding to a particular set of volumes to a respective one of the plurality of trail queues.

4. The method according to claim 1, further including determining a concurrency level for each of the plurality of trail queues.

5. The method according to claim 1, further including de-allocating a drive initially allocated to a first one of the plurality of trail queues after the work items assigned to the first one of the plurality of trail queues are restored.

6. The method according to claim 5, further including re-allocating the drive to a second one of the plurality of trail queues.

7. The method according to claim 1, further including allocating multiple drives to a first one of the plurality of trail queues.

8. A method of restoring multiple work items simultaneously from a backup and restore system, comprising:
   retrieving a list of objects that are restorable by a client;
   displaying a list of the restorable objects for browsing by a user;
   submitting a list of restorable objects marked for restoration by the user, the list of restorable objects including a plurality of work items;
   assigning each of the plurality of work items into a respective one of a plurality of trail queues based upon volume sets on which the plurality of work items are located;
   allocating a plurality of drives to the plurality of trail queues; and
   restoring multiple ones of the plurality of work items simultaneously.

9. The method according to claim 8, wherein the plurality of work items are assigned to respective ones of the plurality of trail queues based upon a level of commonality of the volumes on which the work items are located.

10. The method according to claim 8, wherein a maximum of one drive can be allocated to each of the plurality of trail queues.

11. The method according to claim 8, wherein a maximum concurrency of each of the plurality of trail queues is one.

12. The method according to claim 8, further including de-allocating a drive from a first one of the plurality of trail queues when work items assigned to the first one of the plurality of trail queues are restored.

13. The method according to claim 12, further including re-allocating the drive to a further one of the plurality of trail queues.

14. A backup and restore system for restoring multiple work items simultaneously, comprising:
   a main server;
   a backup storage unit from which a plurality of backed up work items can be restored; and
   a work item server running on the main server for assigning each of the plurality of work items to a respective one of a plurality of trail queues and for allocating a plurality of drives to the plurality of trail queues to simultaneously restore multiple ones of the work items.

15. The system according to claim 14, wherein the backup storage unit includes a plurality of volumes, the work item server assigning the plurality of work items to trail queues based a commonality of volumes on which the work items are located.

16. The system according to claim 14, wherein the work item server allocates one of the plurality of drives to each of the plurality of trail queues until the plurality of drives are allocated.

17. The system according to claim 14, wherein the work item server determines a concurrency for each of the plurality of trail queues.

18. The system according to claim 14, wherein the work item server determines a maximum number of drives that can be allocated to at least one of the plurality of trail queues.

19. The system according to claim 14, wherein the plurality of trail queues each includes a schedule of work item restores that optimizes positioning and reading of media on which the work items are located.

20. The system according to claim 14 wherein the work item server comprises:

means for assigning the plurality of work items to trail queues based upon a commonality of volumes on which the work items are located;

means for allocating the plurality of drives to each of the plurality of trail queues;

means for determining whether trail queue concurrency has been reached; and means for determining a maximum number of drives that can be allocated to at least one of the plurality of trail queues.

* * * * *

UNITED STATES PATENT AND TRADEMARK OFFICE
CERTIFICATE OF CORRECTION

PATENT NO. : 6,721,766 B1
DATED : April 13, 2004
INVENTOR(S) : William Alton Gill et al.

It is certified that error appears in the above-identified patent and that said Letters Patent is hereby corrected as shown below:

Title page,
Item [57], ABSTRACT,
Line 7 and 9, delet "queue have and queue has" and replace with -- queues have and queues has --.

Column 3,
Line 31, delete "queue the" and replace with -- queue, the --.

Column 6,
Line 46, delete "the, recxcpio" and replace with -- the recxcpio --

Column 7,
Line 62, delete "More-particularly" and replace with -- More particularly --.

Column 11,
Line 2, delete "show" and replace with -- shown --.
Line 14, delete "required restore" and replace with -- required to restore --.

Column 12,
Line 11, delete "workitems" and replace with -- work items --.

Column 13,
Line 16, delete "currency" and replace with -- concurrency --.

Column 14,
Line 55, delete "based a" and replace with -- based upon a --.

Signed and Sealed this

Sixth Day of July, 2004

JON W. DUDAS
*Acting Director of the United States Patent and Trademark Office*